United States Patent
Haag et al.

(10) Patent No.: US 12,489,883 B2
(45) Date of Patent: Dec. 2, 2025

(54) DEVICE, METHOD, AND USE OF THE DEVICE FOR ADJUSTING, ASSEMBLING AND/OR TESTING AN ELECTRO-OPTICAL SYSTEM

(71) Applicants: AIXEMTEC GMBH, Herzogenrath (DE); MICROVISION, INC., Redmond, WA (US)

(72) Inventors: Sebastian Haag, Herzogenrath (DE); Florian Hoffmann, Hamburg (DE); Jörn Rosenkranz, Reinfeld (DE)

(73) Assignees: AIXEMTEC GMBH, Herzogenrath (DE); MICROVISION, INC.

( * ) Notice: Subject to any disclaimer, the term of this patent is extended or adjusted under 35 U.S.C. 154(b) by 212 days.

(21) Appl. No.: 17/784,068

(22) PCT Filed: Dec. 10, 2020

(86) PCT No.: PCT/EP2020/085529
§ 371 (c)(1),
(2) Date: Jun. 9, 2022

(87) PCT Pub. No.: WO2021/116285
PCT Pub. Date: Jun. 17, 2021

(65) Prior Publication Data
US 2023/0037764 A1 Feb. 9, 2023

(30) Foreign Application Priority Data
Dec. 10, 2019 (DE) .................. 10 2019 133 738.0

(51) Int. Cl.
*G02B 27/14* (2006.01)
*G01M 11/02* (2006.01)
(Continued)

(52) U.S. Cl.
CPC ...... *H04N 17/002* (2013.01); *G01M 11/0214* (2013.01); *G01M 11/0257* (2013.01);
(Continued)

(58) Field of Classification Search
CPC ...... H04N 17/002; H04N 23/55; H04N 23/56; H04N 23/67; H04N 23/695; H04N 23/90;
(Continued)

(56) References Cited

U.S. PATENT DOCUMENTS 7,643,149 B2 * 1/2010 Freimann ................. G02B 5/32
356/508
7,768,638 B2 * 8/2010 Feng .................... G02B 21/006
356/73
(Continued)

FOREIGN PATENT DOCUMENTS

CN 110226322 A 9/2019
DE 102004010958 A1 9/2005
(Continued)

OTHER PUBLICATIONS

International Search Report and Written Opinion received for International Appl. No. PCT/EP2020/085529, mailed on Jun. 17, 2021, 11 pages.
(Continued)

*Primary Examiner* — Isiaka O Akanbi
(74) *Attorney, Agent, or Firm* — Kilpatrick Townsend & Stockton LLP

(57) ABSTRACT

A device (1) for producing a photoactive system (10), in particular a deactivated photoactive system (10), characterised by: an imaging device (2) having at least one imaging arrangement (20), wherein the at least one imaging arrangement (20) has a beam passage plane (SE) and an optical axis (O), and the at least one imaging arrangement (20) is designed to generate electromagnetic beams which extend
(Continued)

along a beam path and pass through the imaging arrangement (20) on the beam passage plane (SE) and to reflect the electromagnetic beams along the beam path at the photoactive arrangement (11) in order to image, on a first focal plane (B1) of the imaging arrangement (20), an evaluation image of a photoactive arrangement (11) of the photoactive system (10) to be produced, and the electromagnetic beams of the beam path are captured on the first focal plane (B1) in order to capture the evaluation image of the photoactive arrangement (11); and a first holding device (3a) having a first holding plane (Ha), on the first holding plane (Ha), an optical arrangement (12) of the photoactive system (10) to be produced; and a second holding device (3b) having a second holding plane (3b) for holding the photoactive arrangement (11) on the second holding plane (Hb); wherein the first holding device (3a) having the first holding plane (Ha) and/or the second holding device (3a) having the second holding plane (Ha) is/are movably positioned relative to the imaging device (2).

19 Claims, 14 Drawing Sheets

(51) Int. Cl.
| | | |
|---|---|---|
| *G01S 17/89* | (2020.01) | |
| *H04N 17/00* | (2006.01) | |
| *H04N 23/55* | (2023.01) | |
| *H04N 23/56* | (2023.01) | |
| *H04N 23/67* | (2023.01) | |
| *H04N 23/695* | (2023.01) | |
| *H04N 23/90* | (2023.01) | |

(52) U.S. Cl.
CPC ............. *G01S 17/89* (2013.01); *H04N 23/55* (2023.01); *H04N 23/56* (2023.01); *H04N 23/67* (2023.01); *H04N 23/695* (2023.01); *H04N 23/90* (2023.01); *G02B 27/14* (2013.01)

(58) Field of Classification Search
CPC ............ H04N 9/3191; G01M 11/0214; G01M 11/0257; G01S 17/89; G02B 27/14; G03B 43/00
USPC ............................ 356/138, 124, 237.2–237.6
See application file for complete search history.

(56) References Cited

U.S. PATENT DOCUMENTS

| | | | | |
|---|---|---|---|---|
| 7,782,548 | B2* | 8/2010 | Yumiki | G02B 15/144109 |
| | | | | 359/698 |
| 8,614,857 | B2* | 12/2013 | Yumiki | G03B 17/14 |
| | | | | 359/822 |
| 9,863,844 | B2* | 1/2018 | Oya | G01M 11/08 |
| 2005/0128468 | A1* | 6/2005 | Murata | G01M 11/0221 |
| | | | | 356/127 |
| 2009/0180021 | A1* | 7/2009 | Kikuchi | H04N 17/002 |
| | | | | 348/E5.042 |
| 2012/0133924 | A1* | 5/2012 | Heinisch | G01M 11/0221 |
| | | | | 356/73 |
| 2013/0064533 | A1* | 3/2013 | Nakata | G03B 17/02 |
| | | | | 396/76 |
| 2015/0323417 | A1* | 11/2015 | Franz | G02B 27/62 |
| | | | | 356/127 |
| 2017/0132774 | A1* | 5/2017 | Ruprecht | H04N 17/002 |
| 2017/0336286 | A1* | 11/2017 | Oya | G01M 11/0221 |

FOREIGN PATENT DOCUMENTS

| | | | |
|---|---|---|---|
| DE | 102010053422 | B3 | 3/2012 |
| DE | 102014211667 | A1 | 12/2014 |
| EP | 2081391 | A2 | 7/2009 |
| JP | 2010056252 | A | 3/2010 |
| JP | 2018179789 | A | 11/2018 |
| WO | 2017153069 | A1 | 9/2017 |
| WO | WO-2019159427 | A1 * | 8/2019 ............... G02B 7/02 |

OTHER PUBLICATIONS

Application No. CA3164272, Office Action, Mailed on Sep. 11, 2023, 5 pages.
CN202080096094.0, Office Action, Mar. 21, 2025, 15 pages.
Application No. DE102019133738.0, Office Action, Mailed on Jul. 16, 2020, 6 pages.
Application No. EP20829808.3, Office Action, Mailed on Feb. 7, 2024, 8 pages.
Application No. JP2022-535646, Office Action, Mailed on Jul. 23, 2024, 11 pages.
Application No. JP2022-535646, Office Action, Mailed on Jan. 28, 2025, 4 pages.
Application No. KR10-2022-7023570, Office Action, Mailed on Aug. 22, 2024, 6 pages.

* cited by examiner

DEVICE, METHOD, AND USE OF THE DEVICE FOR ADJUSTING, ASSEMBLING AND/OR TESTING AN ELECTRO-OPTICAL SYSTEM

The invention relates to a device, a method and use of the device for producing a photoactive system. The photoactive system is deactivated, in particular, in order to produce by means of the device and the method (deactivated photoactive system). The invention relates, in particular, to a device, a method and use of the device for producing a deactivated photoactive system of a camera.

Photoactive systems are used, for example, as camera modules for mobile phones, in driver assistance systems, as consumer electronics cameras or in medical technology. Sensors in LiDAR systems are further examples of photoactive systems. In this application, a photoactive system is understood, in particular, to be a functional optical system comprising one or more electro-optical transducers. Increasing demands on the image quality to be achieved with the photoactive systems, on the one hand, and increasing miniaturisation of the photoactive systems, on the other hand, are imposing increasingly tougher requirements on the production of photoactive systems with regard to quality, time and costs.

There are prior art devices and methods for producing a photoactive system, which invariably have to activate the photoactive system in order to produce the photoactive system. Such activation requires that the photoactive system be connected to one or more electronic contacts for supplying the photoactive system with electric power and for retrieving one or more electrical signals as data (activated photoactive system). In such prior art devices and methods, the photoactive system to be produced itself forms a measurement means which itself supplies the data necessary for its production. The data are used, in particular, to align an optical arrangement of the photoactive system to be produced, for example one or more optical lenses, in relation to a photoactive arrangement of the photoactive system to be produced, for example a camera chip mounted on a carrier. For alignment purposes, arranging the optical arrangement movably in a holding device and controlling it by means of an adjusting device according to the captured data from the photoactive arrangement, in order to obtain a desired imaging quality of a test structure with the photoactive system to be produced, is known from the prior art, for example.

Such prior art devices and methods for producing a photoactive system, which use the photoactive system in activated form as a measurement means for its own production, i.e. as an activated photoactive system, can be relatively expensive due to the hardware necessary for the electrical power supply and data transmission. In particular, the connection of the photoactive arrangement to the one or more electrical contacts of prior art devices and methods, which is necessary to produce the photoactive system, is relatively more time-consuming. Furthermore, it takes a relatively long time to determine the imaging quality of the test structure by means of the photoactive arrangement commonly used to produce the photoactive system, and with the low frame rate that the photoactive arrangement typically uses. In that respect, devices and methods that use the photoactive system to be produced as a measurement means can be expected to need a relatively long time to produce a photoactive system. The image quality that can be achieved by means of a photoactive system to be produced, in particular by a photoactive system to be produced for a mobile terminal, is also relatively lower. The precision with which the optical arrangement is positioned relative to the photoactive arrangement, and thus the quality of the optical systems to be produced with prior art devices and methods, is therefore limited. The inventors realised that this is due to the fact that a photoactive system which must be activated for its own production has only a low acquisition rate of one or more measurement signals, and that an adjustment rate of adjustment commands to be generated in order to move the holding device is also limited in that respect.

One object of the present invention is therefore to provide a device, a method and use of the device for producing a photoactive system, which reduces or eliminates one or more of the aforementioned disadvantages and/or improves on existing solutions. An object of the present invention, in particular, is to provide a device, a method and use of the device for producing a photoactive system, which allows a photoactive system to be produced more cost-efficiently. It is also an object of the present invention to provide a device, a method and use of the device for producing the photoactive system, which allows a high-quality photoactive system to be produced. Another object of the present invention, in particular, is to provide a device, a method and use of the device for producing a photoactive system, which allows faster production of the photoactive system.

The object of the invention is achieved by the device according to the first aspect of the invention and claim 1.

It should be understood that any device features and steps of the invention described herein, and of the preferred embodiments, are preferably designed to produce not only a single photoactive system but also to simultaneously or sequentially produce a plurality of photoactive systems both independently of and/or in relation to each other. In that respect, the production, in particular the adjustment, assembly and/or testing of a photoactive system includes the production, in particular the adjustment, assembly and/or testing of a single photoactive system or a plurality thereof. It should be understood, in particular, that a photoactive system to be produced has a single or a plurality of optical arrangement and/or a single or a plurality of photoactive arrangements.

The device for producing a photoactive system, in particular a deactivated photoactive system, an electro-optical and/or optoelectronic system, in particular for a projecting and/or imaging electro-optical system, preferably comprises an imaging device, a first holding device and a second holding device. The imaging device comprises at least one imaging arrangement. The at least one imaging arrangement has a beam passage plane and an optical axis. The imaging arrangement is preferably designed to generate and in particular to form electromagnetic beams which extend along a beam path and pass through the imaging arrangement on the beam passage plane. The imaging arrangement is also preferably designed to image, on a first focal plane of the imaging arrangement, an evaluation image of a photoactive arrangement of the photoactive system to be produced, and/or of a test structure, by means of the electromagnetic beams reflected at the photoactive arrangement. For that purpose, the electromagnetic beams emanating from the imaging arrangement on the beam passage plane are reflected at the photoactive arrangement in an operating condition. The electromagnetic beams reflected by the photoactive arrangement re-enter the imaging arrangement through the beam passage plane in the operating condition. The imaging arrangement is also designed, in particular, to capture the evaluation image imaged on the first focal plane. The first holding device preferably has a first holding plane on which an optical arrangement of the photoactive system to be produced can be arranged for production. The second holding device preferably has a second holding plane in which the photoactive arrangement can be arranged for production. In particular, the first holding device of the first holding plane and/or the second holding device having the second holding plane are movably positioned relative to the imaging device. In particular, the first holding device of the first holding plane and/or the second holding device having the second holding plane are movably positioned relative to the imaging device in the operating condition.

The first holding device preferably has a first device axis which extends orthogonally to the first holding plane. The second holding device preferably has a second device axis which extends orthogonally to the second holding plane. The first and/or second device axis are oriented orthogonally to a beam passage plane of one of the at least one imaging arrangement. It may also be preferred that the first and/or second device axis be oriented at an angle to one of the at least one imaging arrangement.

The evaluation image is, in particular, an image of a photoactive arrangement and/or of a test structure, or a reflection of a test pattern and/or of an adjustment mark. A test structure and/or an adjustment mark is preferably a chequerboard pattern, a Siemens star, a cross, an H-structure, or similar. In particular, the test structure can be a structure of a beam source unit, for example of an LED. The test structure is advantageous for producing a photoactive system having a reflective photoactive arrangement. The reflective photoactive arrangement has a reflective surface, in particular. The adjustment mark is used, in particular, to adjust the optical arrangement relative to the photoactive arrangement. One or more adjustment marks are preferably arranged in an edge region or outer region of the photoactive arrangement. The one or more adjustment marks are preferably arranged on a support of the photoactive arrangement. In the operating condition, the one or more adjustment marks are also arranged adjacent to the photoactive arrangement. In particular, the one or more adjustment marks are arranged on the first and/or second holding device. Adjustment marks are physically arranged or inserted reference structures, in particular.

In particular, the test structure is a photoactive arrangement of a photoactive system to be produced. In this preferred embodiment, the optically functional structures of the photoactive arrangement serve as a reference for producing a photoactive system. This has the advantage, in particular, that there is no need to reference the device to markers or to other test structures.

The photoactive system to be produced comprises an electro-optical or an optoelectronic system, in particular. An electro-optical system is designed to convert an electronically generated item of data and/or electronically generated energy into light emission, in particular into electromagnetic radiation. An optoelectronic system is designed to convert light emission, in particular electromagnetic radiation, into electronic data or electrical energy. In the case of the photoactive system to be produced, a distinction is also made, in particular, between an imaging and a projecting system. An imaging system is a camera or a telescope, for example. Examples of a projecting system include, in particular, a dot pattern project for face and/or gesture recognition in a mobile terminal.

The photoactive system to be produced is, in particular, a combination of a projecting system (transmitter unit) and an imaging system (receiver unit). A LiDAR sensor is an example of such a photoactive system. In particular, the photoactive system to be produced may also comprise two or more projecting systems and/or two or more imaging systems.

Such a photoactive system to be produced, in particular a deactivated photoactive system to be produced, comprises a photoactive arrangement and an optical arrangement, in particular. An optical arrangement may comprise one or more lenses. In particular, the one or more lenses may be a spherical and/or aspherical and/or freeform lens. Converging lenses, menisci and diverging lenses are known examples of spherical lenses. Biconvex, plano-convex and concave-convex lenses are examples of preferred converging lenses. Convex-concave, plano-concave and biconcave lenses are examples of preferred diverging lenses. The optical arrangement may comprise, in particular, a combination of several different lenses, in particular different spherical and/or aspherical and/or freeform lenses. In particular, the optical arrangement may be so designed that it focuses electromagnetic beams in one direction at an infinite distance or at a finite distance on a focal plane. The optical arrangement may also be preferably designed in such a way that it focuses electromagnetic beams in a direction opposite to said direction at an infinite distance or at a finite distance on a further focal plane. In particular, the optical arrangement may be designed as an objective lens. The photoactive arrangement comprises, in particular, an image sensor or a camera chip and/or a printed circuit board. The photoactive arrangement preferably comprises an image sensor or camera chip arranged on a carrier. In particular, the photoactive arrangement can be, for example, a CCD chip, a CMOS chip, a VCSEL array, a SPAD array, an InGaAs chip, a microbolometer or a similar component for capturing and/or generating electromagnetic radiation.

The production of a photoactive system preferably includes the adjustment and/or assembly and/or testing of the photoactive system. The production of the photoactive system includes, in particular, the adjustment of the optical arrangement relative to the photoactive arrangement and/or the assembly of the optical arrangement on the photoactive arrangement and/or the testing of the adjusted and/or assembled photoactive system. In particular, the production of a photoactive system includes the adjustment and/or assembly and/or testing of the photoactive system relative to one or more other photoactive systems that have already been adjusted and/or tested. The production of a photoactive system includes, in particular, the adjustment and/or assembly and/or testing of a photoactive arrangement relative to an optical arrangement of a photoactive system to be produced relative to one or more further photoactive systems already adjusted, assembled and/or tested, in particular relative to their optical arrangements and/or photoactive arrangements.

In the operating condition, adjustment comprises the steps of positioning the optical arrangement opposite the photoactive arrangement; moving the optical arrangement and the photoactive arrangement; or moving the optical arrangement relative to a stationarily positioned photoactive arrangement; or moving the photoactive arrangement relative to a stationarily positioned optical arrangement. This applies gilt mutatis mutandis to the first and second holding device of the device. In particular, adjustment comprises translational orientation of the optical arrangement and rotational orienting of the photoactive arrangement. It may also be preferred that adjustment comprises rotational orientation of the optical arrangement and translational orientation of the photoactive arrangement. It may be preferred that adjustment comprises a rotational and translational alignment of both the optical arrangement and the photoactive arrangement.

During adjustment, the first holding device having the optical arrangement to be adjusted is aligned with the second holding device having the photoactive arrangement to be adjusted, and/or vice versa. In particular, the evaluation image of the photoactive system to be adjusted and belonging to the respective at least one imaging arrangement is tested during adjustment. In particular, adjustment comprises detection of an imaging quality of the evaluation image of the respective at least one imaging arrangement. The imaging quality is a sharpness of the evaluation image, for example. The evaluation image is preferably the image of a single photoactive system to be produced. It may be particularly preferred that the evaluation image is a superimposition of two or more images of two or more photoactive systems to be produced. During adjustment, an orientation and/or a position of the optical arrangement and the photoactive arrangement relative to each other are set. Adjustment is preferably carried out in accordance with the evaluation images to be captured of the respective at least one imaging arrangement, in particular according to an imaging quality to be detected for the respective evaluation image. Adjustment is preferably performed according to a value resulting from a mathematical evaluation of a superimposition of two evaluation images. In particular, adjustment is performed with the aid of common methods of industrial image processing or according to features thus extracted. Two or more images of test structures are usually evaluated and/or superimposed. In particular, adjustment is performed according to a value which describes the difference between two test structures in an evaluation image produced by superimposition of two images. Adjustment is based, in particular, on an evaluation of the imaging quality of the respective evaluation image according to the orientation and/or position of the movably positioned first and/or second holding device relative to the imaging device positioned stationarily in the operating condition. For that purpose, the orientation and/or position of the movably positioned first and/or second holding device relative to the imaging device positioned stationarily in the operating condition is adjusted for that purpose in the operating condition and the imaging quality of the respective evaluation image is determined with reference to the stationarily positioned imaging device according to the adjustment of the movably positioned first and/or second holding device.

In order to determine one or more control signals for the movably positioned first and/or second holding device, it is preferred that the imaging quality thus determined for the respective evaluation image be transformed to the frequency domain. The determined imaging quality, which, then especially, is an imaging sharpness of the evaluation image, for example, can be transformed to the frequency domain by means of a Fourier transform, for example. The maximum frequency of the frequency transform corresponds, is, in particular, to the highest imaging sharpness for which the orientation and/or position of the movably positioned first and/or second holding device is known. The image with the most frequency components in the upper, tested frequency domain preferably corresponds to the image with the best imaging sharpness for which the orientation and/or position of the movably positioned first and/or second holding device is known. The control signals can preferably be determined according to a value resulting from a mathematical evaluation of a superimposition of two evaluation images. In particular, the control signals can be determined with the aid of common methods of industrial image processing, according to features thus extracted. The control signals can also be determined from positional differences between test structures that have been extracted in one image area from the evaluation image.

On this basis, the one or more control signals for adjusting the optical arrangement relative to the photoactive arrangement and/or the adjustment to a further photoactive system or vice versa is preferably determined. The control signals can also be determined from values that have been extracted in one image area from the evaluation image.

One of the at least one imaging arrangement is preferably positioned in such a way that its optical axis is aligned substantially parallel to, preferably concentrically with, the first and/or second device axis, in particular after the optical arrangement has been adjusted in relation to the photoactive arrangement. In particular, one of the at least one imaging arrangement is preferably positioned in such a way that its optical axis is substantially aligned, preferably concentrically, with the first and/or second device axis, in particular after two or more optical arrangements have been adjusted in relation to two or more photoactive arrangements. It is also preferred that at least one further one of the at least one imaging arrangement is positioned in such a way that its optical axis is oriented at an angle to the first and/or second device axis. It should be understood, in particular, that the respective at least one imaging arrangement for producing the photoactive system captures different regions of the photoactive arrangement. In particular, the at least one imaging arrangement, the optical axis of which is oriented parallel, preferably concentrically, with the first and/or second device axis, is a centre of the photoactive arrangement, whereas the at least further one of the at least one imaging arrangement, the respective optical axis of which is oriented at an angle to the first and/or second device axis, each captures an edge region of the photoactive arrangement. Such a preferred embodiment has the advantage, in particular, that the optical arrangement and the photoactive arrangement of the photoactive system to be produced are oriented to each other translationally and rotationally in relation to the first and/or second holding device.

In particular, an offset necessary for assembly must be taken into consideration during adjustment. Such an offset may be necessary, for example, in order to compensate for subsequent shrinking due to joining and/or to adjust a system set to infinity which then images at finity, or the like. An offset for adjustment is also necessary, in particular, in order to focus on a desired optically functional structure of the photoactive arrangement of the photoactive system to be produced, from a plane in the photoactive arrangement of a photoactive system to be produced, in which there is a non-optically functional structure, but for which most of the high frequency components have been captured. The offset may also be necessary in order to achieve a desired distance between two test structures in an evaluation image, for example to take parallax effects into account. Such offsets may also be suitable for compensating image field curvature effects, in order to take account of imaging sharpness gradients in the on- and off-axis region of the photoactive system.

It should be understood that the offset of the device is adjusted, in particular, by moving or adjusting the first and/or second holding device in a translational and/or rotational manner. In particular, the offset is adjusted substantially on the first and/or second holding planes along two independent axes and/or about the two independent axes. It may be preferred to move and/or adjust the offset substantially orthogonally to the first and/or second holding planes, in particular along a third independent axis. It is also preferable that the offset be adjusted about the third independent axis.

During assembly, the first holding device having the optical arrangement to be assembled is held in a fixed orientation and/or position relative to the second holding device having the photoactive arrangement to be assembled. In particular, the optical arrangement is connected to the photoactive arrangement during assembly, for example joiningly connected. In particular, the optical arrangement can be connected to the photoactive arrangement form-fittingly, force-fittingly and/or by a material-fit connection during assembly. In particular, assembly comprises gluing, soldering and/or welding in order to connect the optical arrangement to the photoactive arrangement. Assembly preferably comprises curing of the connection, in particular UV curing.

During testing, the adjusted and/or assembled photoactive system is tested. In particular, the evaluation image of the photoactive system to be tested and belonging to the respective imaging arrangement is tested during testing. In particular, testing of the respective evaluation image comprises testing the imaging sharpness of the respective evaluation image. In particular, the orientation and/or position of the optical arrangement and photoactive arrangement adjusted and/or assembled relative to each other is tested during testing. A superimposition of two evaluation images is preferably evaluated mathematically and/or with image processing techniques. In particular, any difference between the positions of a first test structure and a second test structure in an evaluation image can be checked during testing. Such an evaluation image is produced, in particular, by superimposing a plurality of evaluation images when a plurality of photoactive systems are produced simultaneously or sequentially by means of the device.

It should be noted that the photoactive system produced is arranged in the first or the second holding device during testing. The photoactive system produced is preferably arranged for testing in the second holding device.

An operating condition is a condition of the device according to the invention during operation. The operating condition of the device according to the invention comprises the operating condition and preferably a positioning condition. The operating condition may preferably comprise a logistics condition and/or preferably a maintenance condition. The operating condition of the device according to the invention includes, in particular, the production of the photoactive system. In particular, the operating condition of the device according to the invention includes adjusting and/or assembling and/or testing the photoactive system.

In the positioning condition of the device according to the invention, the imaging device is movably positioned. In particular, the imaging device is movably positioned in the positioning condition on a plane parallel with the first and/or second holding plane. In particular, the first and/or second holding device are stationarily positioned and the imaging device is movably positioned in the positioning condition. In particular, the device for moving the imaging device has an imaging drive means and/or an imaging support means and/or an imaging control means.

In the logistics condition of the device according to the invention, the optical arrangement and the photoactive arrangement are preferably provided and fed to the respective holding device and the produced photoactive system is preferably removed. Feeding and/or removal may be carried out piecewise, batchwise or continuously. It may be preferable to feed a plurality of optical arrangements and/or a plurality of photoactive arrangements, in particular at the same time. In particular, the logistics condition also includes positioning the optical arrangement and the photoactive arrangement in the respective holding device.

The maintenance condition of the device according to the invention may include, in particular, a condition of maintaining and servicing the individual elements of the device according to the invention.

In particular, the individual elements, devices, units and arrangements of the device according to the invention may be arranged differently in relation to each other in the operating condition and/or may have different functional relationships with each other than, for example, in the positioning condition and/or the logistics condition and/or the maintenance condition.

The first and/or second holding device are designed to hold the optical arrangement and/or the photoactive arrangement. In particular, the respective holding device is designed to hold and/or to accommodate the optical arrangement and the photoactive arrangement in a form-fitting and/or force-fitting manner. According to the first aspect of the invention, the device may be characterised in that the first holding device is designed to accommodate a photoactive arrangement and the second holding device is designed to accommodate an optical arrangement. The respective holding device may be designed, in particular, to accommodate a magazine having one or more optical arrangements and/or a magazine having one or more photoactive arrangements. The first and/or second holding device are preferably designed as a magazine for accommodating optical arrangements and/or photoactive arrangements and for producing the photoactive system. It may also be preferable to feed the optical arrangement or photoactive arrangement individually to the respective holding device. In particular, the respective holding device is designed to feed the optical arrangement and/or the photoactive arrangement to the holding device in order to produce the photoactive system and to output the photoactive system once it has been produced. A magazine is preferably designed to accommodate one or more photoactive arrangements and/or one or more optical arrangements and to store them temporarily for production of the photoactive system. In particular, the first and/or second holding devices may be designed to accommodate two or more optical arrangements and/or two or more photoactive arrangements. With such a first and/or second holding device, which can accommodate two or more optical arrangements and/or two or more photoactive arrangements, it is possible in particular to produce two or more photoactive systems simultaneously and/or sequentially, both independently and also in relation to each other. In particular, a functional relationship between the photoactive systems relative to each other is produced. In particular, it is also possible to assemble a plurality of optical assemblies successively by moving the imaging device and by moving the first and/or second holding device on a carrier unit having a plurality of photoactive arrangements. The imaging device and the first and/or second holding device are preferably moved in such a way that they are moved in the same direction at the same speed, i.e. that they are stationary in relation to each other. This may be preferred when the photoactive systems to be produced are part of a dual camera or a triple camera, for example.

This is preferred, in particular, when a plurality of photoactive systems, preferably a projecting system and an imaging system or, in particular, two imaging systems, are to be produced sequentially.

In the operating condition, the first holding device and the second holding device are preferably positioned movably relative to the imaging device, whereas the imaging device is positioned stationarily. This is preferred, in particular, when a plurality of photoactive systems, preferably a projecting system and an imaging system, in particular a LiDAR system, preferably two or more imaging systems, for example a multi-camera system, are to be produced sequentially or simultaneously. It may also be preferred that the first holding device be movably positioned relative to the second holding device and the imaging device in the operating condition, whereas the second holding device and the imaging device are positioned stationarily. In particular, it may be preferable in the operating condition that the second holding device be movably positioned relative to the first holding device and the imaging device, whereas the first holding device and the imaging device are stationarily positioned. The first holding device and/or the second holding device are preferably positioned translationally movably along the optical axis. In particular, the first and/or second holding device may be translationally movably positioned transversely to the optical axis. In particular, the first and/or second holding device may be positioned rotationally movably. The first and/or second holding device are preferably positioned rotationally movably about two or three axes oriented orthogonally to each other. In particular, the first and/or second holding device are movably positioned relative to a beam passage plane of the at least one imaging arrangement. In particular, the first and/or second holding device are positioned translationally and/or rotationally movably relative to the beam passage plane of the at least one imaging arrangement.

The device according to the invention is designed to switch into the positioning condition after production of a first photoactive system in the operating condition, and in the positioning state to shift the imaging device optically aligned with the first photoactive system in such a way that it is aligned with a second (still) photoactive system to be produced. In order to produce the second photoactive system to be produced, the device switches back to the operating condition. In particular, the device according to the invention is designed to adjust, after it has been switched back to the operating condition, at least one further optical arrangement and one further photoactive system, in particular at least one further optical arrangement and one further photoactive arrangement, not only in relation to each other but also in relation to the photoactive system that has already been adjusted and/or assembled. In order to adjust the photoactive system, which has still to be adjusted and/or assembled, relative to the photoactive system that has already been adjusted and/or assembled, a virtual test structure is preferably used which was stored from an evaluation image of the test structure of the previously adjusted and/or assembled photoactive system (after adjustment), or from evaluation images captured simultaneously or sequentially from the same imaging device during superimposition.

In particular, the first holding plane of the first holding device is positioned relative to the second holding plane of the second holding device in such a way that the optical arrangement which can be inserted into the first holding device focuses the beam path of the electromagnetic beams on a focal plane which lies, in particular, in the photoactive arrangement which can be inserted into the second holding device and which reflects the electromagnetic beams towards the beam passage plane of the at least one imaging arrangement. The reflected electromagnetic beams pass through the beam passage plane of the at least one imaging arrangement into the at least one imaging arrangement.

A device, an arrangement, a unit, an element, etc. is movably positioned, in particular, when an orientation and/or a position of the device, the arrangement, the unit, the element, etc. is spatially variable relative to a stationarily positioned arrangement, a stationarily positioned unit, a stationarily positioned element, etc. A device, an arrangement, a unit, an element, etc. is stationarily positioned, in particular, when the orientation and/or the position of the device, the arrangement, the unit, the element, etc. is spatially invariable. The device, the arrangement, the unit, the element, etc. are stationary, in particular, when they are not movably positioned.

The imaging device preferably comprises two, three, four, five or six imaging arrangements. In particular, the imaging device may also comprise more than six imaging arrangements. It may be preferred that the imaging device comprises seven, eight, nine, ten, eleven, twelve or more imaging arrangements, in particular. Each respective imaging arrangements may comprise a beam passage plane and an optical axis. The optical axis of the at least one imaging arrangement is preferably arranged orthogonally to the beam passage plane. It may be preferred that a first part of the at least one imaging arrangement is aligned with a first photoactive system to be produced and a second part of the at least one imaging arrangement is aligned with a second photoactive system to be produced. It may also be advantageous to design the imaging device so that it can be moved, in order to produce successively and/or simultaneously a plurality of photoactive systems to be produced relatively to each other.

A device for producing a deactivated photoactive system is characterised, in particular, in that an evaluation image to be captured is not captured by means of the photoactive system to be produced. According to the first aspect, the device according to the invention is characterised, in particular, in that the deactivated photoactive system to be produced, in particular its photoactive arrangement, is not connected in the operating condition to one or more electrical contacts, i.e. it is not supplied with electrical power or designed for data transmission. The deactivated photoactive system to be produced is preferably deactivated during production. During its production, in particular, such a deactivated photoactive system is not supplied with electrical energy. In particular, such a deactivated photoactive system is not contacted during its production with electrical contacts for the purpose of data transmission. In particular, during production of the deactivated photoactive system, no signals or data from the photoactive system to be produced, or from the photoactive arrangement, are captured in the operating condition for production purposes, relating for example to the imaging sharpness, and which are used to produce the photoactive system, in particular to align the optical arrangement relative to the photoactive arrangement.

In that respect, the device according to the invention preferably does not include any connections for transmitting electrical energy and/or electrical signals as data from the photoactive system to be produced. The device is characterised, in particular, in that no data from the photoactive system to be produced, in particular from its photoactive arrangement, are used in the operating condition of the device to align the optical arrangement relative to the photoactive arrangement. In particular, the device according to the invention is characterised in that the first or second holding device is designed, in the operating condition of the device, to accommodate the photoactive arrangement, whereas the photoactive arrangement is designed, in the operating condition of the device, to reflect electromagnetic beams, the reflected beams entering through the beam passage plane of the at least one imaging arrangement into the at least one imaging arrangement, where they are detected.

In particular, the device for producing a deactivated photoactive system has the advantage that the device does not require any electrical contacting of the deactivated photoactive system to be produced. This advantageously reduces the production costs and the manufacturing costs and maintenance costs of the device. Furthermore, in order to produce the deactivated photoactive system, the deactivated photoactive system does not need to be connected to electrical contacts. This can significantly reduce the production time of a photoactive system to be produced.

Advantageously, there is no need, in particular, for the hardware that is otherwise necessary for contacting the photoactive system to be produced, for controlling and for operating the photoactive system to be produced. This can result in a significant reduction in process time and reduced costs.

In particular, an imaging device having a plurality of imaging arrangements allows a photoactive system with a particularly high imaging sharpness to be produced. In a particularly advantageous manner, the sensitivity of the imaging device can also be positively influenced by the dual beam passage through the optical arrangement to be adjusted and/or assembled, because imaging errors are amplified by the reflection of the electromagnetic beams.

The device according to the invention is based, in particular, on the realisation by the inventors that the time needed to produce a photoactive system using prior art devices is limited by the frame rate of the photoactive arrangement. The advantageous positioning of an imaging device allows an evaluation image to be captured and the evaluation image to be evaluation at a significantly higher speed due to substantially the higher frame rates of the imaging device. This reduces in a particularly advantageous manner the production time of a photoactive system to be produced.

According to a first preferred embodiment, the first holding device is arranged between the second holding device and the imaging device. In this preferred embodiment, the device is oriented towards a structure for a reflected-light procedure. Such a preferred arrangement in this embodiment allows a photoactive system to be produced particularly cost-efficiently and quickly. This embodiment is based, in particular, on an easily implemented arrangement of the imaging device and the optical arrangement and photoactive arrangement to be produced.

According to another preferred development of the device, the at least one imaging arrangement and the first holding device are arranged at a first distance from each other along the optical axis; and the first holding device and the second holding device are arranged at a second distance from each other along the optical axis. If the imaging device comprises a plurality of imaging arrangements, the first distance between the first holding device and the respective imaging arrangement may vary. It may be preferred that the first distance between the first holding device and the respective imaging arrangement is identical. A third distance, in particular, is a focal length of the imaging module. The focal length is the distance, in particular, between a principal plane of the imaging module and the first focal plane.

The first distance is limited in terms of its maximum by the vignetting effect, in particular. The ratio of the third distance to the second distance is preferably at least 1:1 and a maximum of 100:1. In particular, the ratio of the third distance to the second distance may be at least 0.5:1. The ratio of the third distance to the second distance is preferably also in the order of 1:1 to 10:1. In particular, the second distance corresponds substantially to the focal length of the optical arrangement of the photoactive system to be produced. After adjustment and/or assembling and/or testing has been carried out, the first holding device is spaced apart from the second holding device in such a way, in particular, that the third focal plane of the optical arrangement is located along the optical axis in the direction of the second holding plane in the photoactive arrangement, in particular on the second holding plane of the second holding device. The photoactive arrangement preferably has a photoactive imaging plane, the photoactive arrangement preferably being arranged in such a way in the second holding device that the second holding plane lies on the photoactive imaging plane.

According to another preferred development of the invention, the first and/or second holding device are designed to accommodate two or more optical arrangements and/or two or more photoactive arrangements, the first holding device preferably being designed to move two or more optical arrangements rotationally and/or translationally and independently of each other; and/or the second holding device preferably being designed to move two or more photoactive arrangements rotationally and/or translationally and independently of each other. It may also be preferred that the device is designed to move the imaging device rotationally and/or translationally relative to the first and/or second holding device and independently of the first and/or second holding device.

In this preferred embodiment, the first holding device is designed to move the optical arrangements rotationally and/or translationally and independently of each other. In particular, the first holding device may have two or more holding units for this purpose, which are positioned and/or oriented and/or driven independently of each other and rotationally and/or translationally movably. In this preferred embodiment, the second holding device is also designed to move the photoactive arrangement rotationally and/or translationally and independently of each other. In particular, the second holding device may have two or more holding units for this purpose, which are positioned and/or oriented and/or driven independently of each other and rotationally and/or translationally movably. The rotational movement includes turning and/or pivoting the first and/or second holding device about three independent axes (three rotational degrees of freedom). The translational movement includes displacing and/or moving along the three independent axes (three translational degrees of freedom).

This preferred embodiment has the advantage that two or more photoactive systems can be adjusted and/or assembled simultaneously or successively, i.e. sequentially, both independently and in relation to each other.

It should also be understood that the imaging device is designed to simultaneously image the two or more photoactive systems to be produced, in particular the two or more photoactive arrangements of the photoactive systems to be produced. In particular, the imaging device which has a single imaging arrangement is designed to simultaneously image the two or more photoactive systems to be produced, in particular the two or more photoactive arrangements of the photoactive systems to be produced. The imaging device, in particular a single imaging arrangement, preferably comprises a converging lens as an imaging element of the imaging module. To that end, a beam source unit firstly illuminates a first photoactive system to be produced and then a second or further photoactive system to be produced. A global illumination unit, in particular a beam source unit, may preferably be used and the respective photoactive systems to be produced can be illuminated individually by a switchable shading unit, in particular by a rotationally mounted shading unit. It may also be preferred that, via a beam source arranged outside the imaging device, the electromagnetic beams of which are coupled coaxially with the optical axis of the imaging device between the beam passage plane and the first holding plane, that the latter illuminate the left and the right photoactive system alternately. It may also be preferred that the first and second photoactive system to be produced be illuminated alternately via optical fibres which are preferably arranged on the optical arrangement of the first and second photoactive systems to be produced in order to illuminate the photoactive systems to be produced.

This has the advantage, in particular, that two or more photoactive systems to be produced, in particular two or more photoactive arrangements of the photoactive systems to be produced, can be detected simultaneously by means of the imaging device, in particular by one having a single imaging arrangement. This also has the advantage that the evaluation images of the two or more photoactive systems to be produced can be physically superimposed simultaneously in the imaging device, in particular in the single imaging arrangement, and hence that there is no need for virtual superimposition downstream. This advantageously minimises the assembly time, on the one hand, and minimises the complexity of the structure, on the other.

According to another preferred embodiment, the imaging device is designed so that it can be moved, in order to produce successively and/or simultaneously a plurality of photoactive systems to be produced relatively to each other. One or more of the imaging arrangements of the imaging device are preferably designed to be movable. The imaging device, in particular the at least one imaging arrangement, can be moved substantially parallel with the first and/or second holding planes of the first and/or second holding device. It is preferred, additionally or alternatively, that the imaging device, in particular the at least one imaging arrangement, is pivotably arranged and/or oriented and/or driven relative to the first and/or second holding planes of the first and/or second holding device.

According to a preferred development of the invention, a first part of the at least one imaging arrangement is aligned with a first photoactive system to be produced and a second part of the at least one imaging arrangement is aligned with a second photoactive system to be produced. The first part of the at least one imaging arrangement is a first area, preferably a first subarea of a free aperture. The second part of the at least one imaging arrangement is a second area, preferably a second subarea of the free aperture. The free aperture is the free aperture of an imaging module and/or imaging element, preferably of a converging lens, of the at least one imaging arrangement.

According to another preferred embodiment, the imaging device has two imaging arrangements, wherein said two imaging arrangements are arranged in such a way that their optical axes extend parallel with one another, wherein one of said two imaging arrangements is aligned with a photoactive system to be produced and another of the two imaging arrangements is aligned with another photoactive system to be produced.

This preferred embodiment allows the two photoactive systems to be produced to adjust themselves relative to themselves in a preferred manner. In particular, the adjusting can be carried out simultaneously and to that extent does not have to be sequential. This has the advantage that the production time needed to produce a plurality of photoactive systems can be saved. In order to adjust the plurality of photoactive systems, evaluation images are superimposed and compared in the imaging device.

According to another preferred development of the device, the first holding plane of the first holding device is arranged substantially parallel with respect to the beam passage plane of at least one imaging arrangement and/or is arranged non-parallel at a distance from the beam passage plane of at least one other of the at least one imaging arrangement. In particular, at least one, in particular a single at least one imaging arrangement is designed in such a way that its optical axis is oriented parallel, in particular concentrically with the first and/or second device axis. It is also preferred that at least one of the at least one imaging arrangement is positioned in such a way that its optical axis is oriented at an angle to the first and/or second device axis. In particular, the at least one imaging arrangement is positioned in such a way that its optical axis extends in the operating condition centrally through the optical arrangement positioned in the first and/or second holding device. In particular, the at least one imaging arrangement is positioned in such a way that in the operating condition its optical axis intersects the first and/or second device axis in the positioned optical arrangement.

A single imaging arrangement having the beam passage plane is preferably oriented substantially parallel with the first and/or second holding plane of the first and/or second holding device. Its optical axis, in particular, is substantially concentric with the first and/or second device axis. Such an arrangement is suitable, in particular, for translational adjustment of the optical arrangement relative to the photoactive arrangement along the optical axis of the single imaging arrangement. It may also be preferred that the imaging device has one or more imaging arrangements, the beam passage planes of which are each arranged substantially at an angle to the first and/or second holding plane. Such a preferred arrangement is suitable, in particular, for rotational adjustment of the optical arrangement relative to the photoactive arrangement. The imaging arrangements arranged at an angle to the first and/or second holding device are preferably arranged at an angle of at least 0° and at most 90° relative, in particular, to the first and/or second holding plane. In particular, the imaging arrangements arranged and oriented at an angle to the first and/or second holding plane are at substantially equidistant from the first and/or second holding device. It is also preferred that the imaging arrangements arranged and oriented at an angle to the first and/or second holding plane are arranged on a circular path. The circular path may have a constant or a varying curvature. In particular, the circular path is an ellipse. The imaging arrangements arranged on the circular path are preferably spaced apart from each other by substantially the same distance. In particular, the imaging arrangements arranged on the circular path may be arranged at an angle of 30°, 45°, 60°, 90 or 120° to each other relative to a centre point of the circular path. Other angles may also be preferred. In particular, the angle depends on the photoactive system to be produced. The angle preferably depends on an aperture angle, i.e. the numerical aperture of the optical arrangement of the photoactive system to be produced and the geometry of the photoactive arrangement of photoactive system, and on the positions of the adjustment marks.

According to another preferred embodiment of the device, the at least one imaging device comprises an imaging module in which the beam passage plane is arranged and which has the optical axis, wherein the imaging module is designed to image at infinity or at finity in the direction of the second holding plane along the optical axis with a second focal length on a second focal plane and to image at infinity or at finity in an opposite direction with the first focal length on the first focal plane; and/or a beam source unit which provides electromagnetic beams for generating and for capturing the evaluation image; and/or a beam splitter unit which deflects the at least one part of the electromagnetic beams of the beam source unit towards the photoactive system to be produced; and/or an image capturing unit which is designed to capture the evaluation image of the photoactive system to be produced, wherein the image capturing unit is arranged on the first focal plane of the imaging module in order to capture the evaluation image of the photoactive system to be produced; and/or a diffuser unit for scattering the electromagnetic beams from the beam source unit; and/or a filter unit or filtering electromagnetic beams having a wavelength to be filtered; and/or a test structure device for generating a test structure on the photoactive arrangement of the photoactive system to be produced, which is reflected by the photoactive arrangement and is captured and evaluated as an evaluation image in the imaging device. This has the advantage, in particular, that photoactive systems with a photoactive arrangement can be produced which have a low contrast and/or a reflecting surface. Such a preferred embodiment may be preferred for signal processing, in particular.

The imaging module may comprise one or more imaging elements. An imaging element may be a lens. In particular, the lens may be a spherical and/or aspherical and/or freeform lens. Converging lenses, menisci and diverging lenses are known examples of spherical lenses. Biconvex, plano-convex and concave-convex lenses are examples of preferred converging lenses. Convex-concave, plano-concave and biconcave lenses are examples of preferred diverging lenses. The imaging module preferably comprises a converging lens. The imaging module is designed, in particular, to convert the electromagnetic beams from the beam source unit into a parallel electromagnetic beam and to focus reflected electromagnetic beams from the photoactive arrangement as an objective lens for capturing the evaluation image on the first focal plane. The imaging module preferably comprises a prime lens.

A beam splitter unit can preferably be a glass pane. The glass pane may be inserted at an angle of 45° to the optical axis, for example. A beam splitter is designed to reflect part of the electromagnetic beams at the glass pane, with a remaining part passing through the glass pane. By applying a suitable partially reflective coating to the glass pane, the electromagnetic beam can preferably be split into two electromagnetic beams of equal intensity. Such a beam splitter unit is also known as an output mirror. The beam splitter unit preferably also comprises a wedge prism, a pellicle, a biprism and/or a pentaprism.

The beam source unit is preferably a substantially point light source. The beam source unit is preferably an LED, an optical fibre or a coiled filament. It is particularly preferred that the beam source unit generates monochromatic electromagnetic beams. In particular, the beam source unit is a visible light source. The beam source unit is designed, in particular, to couple electromagnetic beams into the beam path via the beam splitter of the imaging device. In particular, electromagnetic beams coupled in this way exit the imaging device via the beam passage plane and are reflected by the photoactive arrangement via the beam to re-enter the imaging device via the beam passage plane.

The diffuser unit is designed to scatter electromagnetic beams. In particular, the diffuser unit is designed to illuminate uniformly the photoactive system to be produced. The diffuser unit is preferably arranged in focal plane B1. In particular, the device may have a slotted disc additionally and/or alternatively to the diffuser unit.

The filter unit is designed to filter electromagnetic beams of a particular wavelength. In particular, the filter unit is preferably designed to filter electromagnetic beams only in a narrow wavelength band. A narrow wavelength band is preferably in a range between at least 10 nm, 20 nm, 50 nm, 100 nm or 200 nm and at most 10 nm, 20 nm, 50 nm, 100 nm or 200 nm. In particular, the filter unit is designed to filter long-wave electromagnetic beams. In particular, the filter unit is designed not to filter electromagnetic beams with a wavelength in the ultraviolet range and less. Such a filter unit that does not filter electromagnetic beams in a narrow wavelength band and/or a filter unit that does not filter electromagnetic beams with a wavelength in the ultraviolet range and less allows an evaluation image to be imaged with a significantly higher imaging sharpness. With such a filter unit, it is possible, in particular, to image, capture and/or evaluate structures of the photoactive arrangement or a test structure with a significantly higher imaging sharpness. The filter unit is arranged, in particular, between the beam source unit and the beam splitter unit. Additionally or alternatively, the filter unit may be arranged between the beam splitter unit and the image capturing unit.

The test structures generated by the test structure device are test images, in particular. The test structure device couples the test structures into the beam path of the electromagnetic beams. The test structure device is designed, in particular, to generate the test structure which images the optical arrangement of the photoactive system to be produced on the photoactive arrangement of the photoactive system to be produced. The test structure device is preferably arranged between the beam source unit and the beam splitter unit. The test structure device is preferably arranged in the focal plane B1. In particular, the test structure device may be arranged in the focal plane of the imaging module. The diffuser unit is preferably arranged between the test structure device and the beam source unit. In particular, the diffuser unit and the test structure device are arranged on the first focal plane of the imaging module to the side of the beam source unit behind the beam splitter. In particular, the test structure device may be formed on a surface of the diffuser unit, which is preferably located on the first focal plane of the imaging module to the side of the beam source unit behind the beam splitter. The test structure device is preferably arranged alongside the diffuser unit along the electromagnetic beams.

The light source unit and/or the imaging unit and/or the beam splitter unit preferably include the test structure device. It may also be preferred that the test structure device is a separate device from the imaging device. This may be particular relevant for photoactive systems to be produced which are projecting photoactive systems.

According to another preferred embodiment of the device, the imaging device comprises a collimator, preferably a focusable collimator, and in particular an autocollimator. Such a preferred embodiment is based, in particular, on a conventional structure for an imaging device. In that respect, this preferred embodiment is particularly cost-efficient and easy to operate.

In another preferred development of the invention, the image capturing unit comprises a camera for capturing the evaluation image, generated by the electro-optical system to be produced, of the respective at least one imaging arrangement; and/or in particular a power electronics module for processing and transmitting the respective evaluation image captured by the image capturing unit; and/or in particular an image sensor for capturing the evaluation image generated by the electro-optical system to be produced.

The camera includes, in particular, an image sensor which is arranged in an imaging plane. The image sensor is a chip, in particular. The camera is arranged in such a way that the imaging plane is arranged orthogonally to the optical axis. The camera can also be arranged in such a way that the imaging plane is arranged substantially non-orthogonally to the first and/or second device axis.

In particular, the image capturing unit is stationary relative to the imaging module. The camera is preferably positioned relative to the imaging module in such a way that the imaging plane with the first focal length is arranged at a distance from the imaging module. In particular, the camera is arranged relative to the imaging module in such a way that the first focal plane of the imaging module lies on the imaging plane of the camera. The image sensor is preferably arranged relative to the imaging module in such a way that the imaging plane with the first focal length is arranged at a distance from the imaging module. In particular, the image sensor is arranged relative to the imaging module in such a way that the first focal plane of the imaging module lies on the imaging plane of the image sensor.

The imaging unit and the imaging module are also preferably arranged stationarily relative to the second holding device. In this preferred embodiment, the photoactive system to be produced can be produced, in particular adjusted and/or assembled and/or tested, by moving the first holding device.

This preferred embodiment has the particular advantage of producing the photoactive system, in particular of adjusting the photoactive arrangement of the photoactive system, without having to connect the photoactive arrangement of the photoactive system to an electrical power supply and/or to a controller for signal transmission.

The power electronics module may be designed, in particular, to capture the evaluation image to be captured of the photoactive arrangement of the photoactive system to be produced. The power electronics module is preferably designed to evaluate the captured evaluation image. In particular, the power electronics module is designed to determine an imaging sharpness of the captured evaluation image. The power electronics module is also designed, in particular, to generate a signal for the orientation of the first holding device relative to the second holding device. The signal for orientation is generated, in particular, according to the respective captured evaluation image. The signal for orientation is a control signal, in particular. Evaluation of the captured evaluation image includes evaluation of the imaging sharpness, in particular. Evaluation is preferably a modulation transfer function. In order to evaluate the evaluation image to be captured, the power electronics module preferably comprises an Application Specific Integrated Circuit (ASIC) and/or a Field Programmable Gate Array (FPGA) and/or a microcontroller (PIC). The power electronics module is designed, in particular, to provide a control signal according to the evaluation for an adjusting device for adjusting an orientation and/or position of the first and/or second holding device relative to the beam passage plane of the at least one imaging arrangement.

The power electronics module is designed, in particular, to identify any difference between the positions of a first test structure and a second test structure. The position of the first test structure is derived from a simultaneously captured and/or stored evaluation image of a photoactive system after adjustment. The second test structure is derived from the captured second evaluation image of the further photoactive system still to be produced. In particular, evaluation of the evaluation image also includes evaluation of the difference between the positions of the first and second test structure. In particular, evaluation also includes forming a vector difference between real and/or virtual test structures of the captured evaluation images.

It should be understood that, in the context of the application, the power electronics module relates in particular to fast signal processing and generation of control and regulation signals for carrying out adjustment faster. Autofocus units of SLR cameras are examples of similar power electronics modules. The power electronics module allows measurement, regulation and control procedures to be carried out quickly.

The power electronics module is preferably in signal communication with the camera and/or an adjusting device for adjusting an orientation and/or position of the first and/or second holding device relative to the beam passage plane of the at least one imaging arrangement. In particular, the power electronics module may be integrated in the camera.

In particular, the image capturing unit may include an autofocus module which is designed to evaluate the captured evaluation image and to provide a control signal, depending on the evaluation, for the adjusting device for adjusting the orientation and/or position of the first and/or second holding device relative to the beam passage plane of the at least one imaging arrangement.

According to another preferred embodiment, the device according to the invention comprises the adjusting device for adjusting the orientation and/or the position of the first holding plane of the first holding device and/or of the second holding plane of the second holding device relative to the beam passage plane of the at least one imaging arrangement; the adjusting device preferably having a drive means. In particular, the drive means comprises at least one piezoelectric drive and/or an electromagnetic drive and/or an electromagnetic drive and/or a parallel kinematics system.

The adjusting device is designed to adjust the orientation and the position of the first and second holding device relative to each other. In particular, the adjusting device is designed to adjust the orientation and the position of a movably positioned first holding device relative to a stationarily positioned second holding device. The adjusting device is also preferably designed to adjust the orientation and the position of a stationarily positioned first holding device relative to a movably positioned second holding device. It may also be preferred that the adjusting device be designed to adjust the orientation and position of a movably positioned first holding device relative to a movably positioned second holding device. In particular, it may be preferred that the first holding device is translationally movably positioned and the second holding device is rotationally movably positioned, or vice versa. In particular, the adjusting device is connected to the respective movably positioned holding device.

In the operating condition of the device, the adjusting device is designed, in particular, to adjust the orientation and the position of the optical arrangement held in the first holding device and the photoactive arrangement held in the second holding device in relation to each other. In the operating condition, the second holding device is preferably positioned stationarily relative to the imaging device, and the first holding device is movably positioned relative to the imaging device and the second holding device. In this preferred arrangement, the adjusting device is designed to adjust the orientation and the position of the first holding device relative to the second holding device by moving the first holding device.

The adjusting device preferably has one or more axes. The one or more axes may be stacked. In particular, the one or more axes are linear axes and/or goniometric axes. The one or more axes are preferably oriented orthogonally to each other. In particular, the adjusting device may have or may be a parallel kinematics system which allows a pivot point to be moved, in particular to be moved freely. In particular, the adjusting device may be or comprise a parallel kinematics system. In particular, the parallel kinematics system is a hexapod.

The adjusting device is also preferably designed to hold the first and/or second holding device stationary in a position and an orientation, in particular in the position and orientation in which the optical arrangement is oriented relative to the photoactive arrangement in such a way that the photoactive arrangement is imaged with an evaluation image having a required imaging quality. The adjusting device is designed, in particular, to hold a plurality of optical arrangements and/or photoactive arrangements in order to capture one or more evaluation images.

In this preferred embodiment, the photoactive system can be produced quickly, exactly and cost-efficiently in a particularly suitable manner.

In another preferred development of the invention, the device includes a support device which is designed to support the first holding device and/or the second holding device translationally and/or rotationally relative to the imaging device in the operating condition; and/or the drive means which is designed to drive the first holding device and/or the second holding device translationally and/or rotationally in the operating condition.

The support device is preferably designed to support the first holding device and/or the second holding device translationally and/or rotationally movably relative to the imaging device. In particular, the support device and/or the drive means are designed to support and/or to move the holding device translationally along one, two or three linear axes and/or to support and/or to move the holding device rotationally about one, two or three linear axes. The two or the three linear axes are preferably oriented orthogonally to each other. In particular, the support device and/or the drive means are so designed that the support device and/or the drive means have up to six degrees of freedom. The support device and/or the drive means may also have more than six degrees of freedom.

The support device and/or the drive means are designed, in particular, to translationally and/or rotationally support and/or drive, independently of each other, two or more optical arrangements and/or photoactive arrangements arranged in the first and/or the second holding device.

According to another preferred embodiment, the device according to the invention further comprises a joining device which is designed to connect the photoactive arrangement and the optical arrangement to each other, in particular to connect them joiningly to each other. The joining device is designed, in particular, to produce a welded, soldered and/or adhesive connection between the optical arrangement and the photoactive arrangement. The joining device is designed for UV bonding, in particular. The joining device preferably comprises a UV bonding unit.

In another preferred development of the invention, the device includes an evaluation device for evaluating the captured evaluation images of the at least one imaging arrangement, wherein die evaluation device is preferably in signal communication with the imaging device, in particular with the image capturing unit and/or the adjusting device and/or the joining device; and/or in particular has a power electronics module for processing and transmitting the evaluation image captured by the respective image capturing unit; and/or in particular has a control unit for controlling the adjusting device according to the result of evaluating the respective evaluation image captured and/or for controlling the joining device; wherein the control unit includes, in particular, an autofocus module for automated focusing of the device in the operating condition.

The evaluation unit is preferably designed to perform the following steps: capturing the respective evaluation image; and/or evaluating the respective evaluation image; and/or determining one or more control signals for controlling the first and/or second holding device according to the result of evaluating the respective evaluation image; and/or providing the one or more control signals for control purposes. In particular, evaluating the respective evaluation image comprises evaluating the imaging sharpness of the respective evaluation image. Evaluating the imaging sharpness comprises, in particular, transforming the evaluation images to a frequency domain and analysing the frequency domain of the evaluation image. The imaging sharpness is transformed, in particular, by means of the Fourier transform.

The evaluation unit is designed, in particular, to evaluate the evaluation image of the photoactive system to be produced, which is captured by the imaging device, and in particular to detect adjustment marks outside the photoactive arrangement or in the edge region of the photoactive arrangement and to derive control commands therefrom. The evaluation unit is designed, in particular, to perform the step of generating an illumination.

In particular, the power electronics module is designed to evaluate the respective evaluation image. The power electronics module comprises, in particular, the features, functions and other properties of the previously described power electronics module which preferably includes the image capturing unit. It may be preferred that both the image capturing unit and the evaluation unit have a power electronics module.

The control unit is designed, in particular, to determine the one or more control signals for controlling the adjusting device of the first and/or second holding device and/or to provide the adjusting device, in particular the drive means, in signal communication.

The data evaluation unit is or comprises a digital data processing unit, for example a personal computer, a workstation, a real-time machine controller and/or an electronic circuit.

According to a second aspect of the invention, the object is achieved by the method according to claim 13.

According to the second aspect of the invention, the method for producing a photoactive system, in particular a deactivated photoactive system, an electro-optical and/or an optoelectronic system, in particular for a projecting and/or imaging electro-optical system, preferably comprises the following steps: providing a device according to the first aspect of the invention and/or its preferred embodiments; and/or providing and arranging a photoactive arrangement in the second holding device, in particular providing and arranging two or more photoactive arrangements in the second holding device; and/or providing and arranging an optical arrangement in the first holding device, in particular providing and arranging two or more optical arrangements in the first holding device.

In a first preferred embodiment, the method for producing the photoactive system comprises the following steps in particular: adjusting the optical arrangement with respect to the photoactive arrangement; and/or assembling the optical arrangement adjusted with respect to the photoactive arrangement; and/or testing the optical arrangement assembled opposite the photoactive arrangement.

The adjusting step comprises the following steps, in particular: providing an electromagnetic beam for imaging, in the respective at least one imaging arrangement, an evaluation image of the photoactive system to be produced; and/or imaging, in the respective at least one imaging arrangement, the evaluation image of the photoactive system to be produced; and/or capturing the evaluation image in the respective at least one imaging arrangement; and/or evaluating the respective captured evaluation image; and/or adjusting the first holding device having the optical arrangement disposed therein, and/or the second holding device having the photoactive arrangement disposed therein, depending on the evaluation of the respective captured evaluation image. It should be understood that the steps of adjusting are performed iteratively, in particular.

The method includes, in particular, the step of: determining an imaging quality, in particular an imaging sharpness, of the captured evaluation image of the at least one imaging arrangement.

Evaluating the evaluation image includes, in particular, evaluating an imaging sharpness of the evaluation image captured by the respective imaging arrangement. The imaging sharpness is evaluated, in particular, by analysing the modulation transfer function of the imaging sharpness of the evaluation image captured by the respective imaging arrangement. Evaluating also preferably includes identifying and/or capturing the edge regions of the photoactive arrangement. Identifying includes, in particular, recognising one or more edges or the adjustment marks in the immediate vicinity of the photoactive arrangement depending, depending on the evaluation of the evaluation image.

In particular, evaluating by means of a device which has an imaging device having two or more imaging arrangements, wherein a first imaging arrangement is oriented relative to a first and/or a second holding device in such a way that the beam passage plane is substantially parallel with the first and/or second holding plane, and the other imaging arrangement is oriented relative to a first and/or second holding device in such a way that its respective beam passage plane is at an angle to the first and/or second holding plane, comprises evaluating the imaging sharpness by analysing the modulation transfer function of the imaging sharpness of the evaluation image captured by means of the first imaging arrangement in order to determine one or more control signals for translationally adjusting the first and/or second holding device along one or more axes; and/or evaluating the imaging sharpness by analysing the modulation transfer function of the imaging sharpness of the evaluation images captured by means of the other imaging arrangements in order to determine one or more control signals for rotationally adjusting the first and/or second holding device about the one or more axes.

Adjusting the first holding device with the optical arrangement disposed therein and/or the second holding device with the photoactive arrangement disposed therein is carried out, in particular, according to the evaluation of a determined imaging sharpness of the respective evaluation image that was captured. In particular, adjusting the first and/or second holding device may depend on the evaluation of several evaluation images that have been captured by a plurality of imaging arrangements. In particular, the first and/or the second holding device is translationally adjusted along one or more axes and/or rotationally about the one or more axes.

The step of adjusting the first and/or second holding device is preferably carried out in several steps. In particular, the adjustment may be an adjustment of the first or second holding device along one or more translational axes. The first and/or second holding device may also be rotationally adjusted about one or more axes.

The adjustment may be carried out, in particular, according to the imaging quality of a single evaluation image or according to the respective imaging quality of a plurality of evaluation images. In particular, the step of rotationally adjusting the first and/or second holding device is carried out according to the imaging sharpness of the captured evaluation images from edge regions of the photoactive arrangement. The step of translationally adjusting is preferably carried out in two spatial directions orthogonally to the first and/or second device axis of the first and/or second holding device, in particular according to the captured evaluation images, preferably according to the position of one or more reference marks which are not on the photoactive arrangement and/or optical arrangement or on one or more edges of the photoactive arrangement. The step of rotationally adjusting the first and/or second holding device is carried out, in particular, according to the evaluation of the imaging sharpness of captured evaluation images from the edge regions of the optical system to be produced. In particular, imaging arrangements whose beam passage plane is not parallel with the first and/or second holding plane, capture evaluation images from the edge regions of the photoactive arrangement. The control signal for rotationally adjusting the first and/or second holding device is obtained from the difference between the imaging quality of the evaluation images from the edge regions of the photoactive arrangement. In particular, it is possible by means of adjustment marks which are preferably arranged immediately adjacent to the photoactive arrangement to adjust the optical arrangement and the photoactive arrangement of the photoactive system to be produced, relative to each other in the translational direction. Additionally or alternatively, it may be preferred that the edges of the photoactive arrangement be used for this purpose. Their position and/or orientation is preferably evaluated for that purpose by evaluating the respective captured evaluation image by means of the evaluation unit, and by calculating and performing a corrective movement. The corrective movement can be a translational and/or rotational movement. The corrective movement may include superimposition of several translational and/or of several rotational movements.

The step of assembling preferably includes the step of connecting, in particular joining, the optical arrangement to the photoactive arrangement. The step of connecting includes connecting in a form-fitting and/or force-fitting manner and/or by a material-fit connection. The step of connecting preferably includes gluing and curing, in particular UV curing.

The step of testing preferably includes the following steps: providing an electromagnetic beam for imaging, in the respective at least one imaging arrangement, an evaluation image of the photoactive system to be produced; and/or imaging the evaluation image of the adjusted and/or assembled photoactive system in the respective at least one imaging arrangement; and/or capturing the evaluation image in the respective at least one imaging arrangement; and/or evaluating the respective captured evaluation image.

It is also preferred that the method for producing the photoactive system comprises moving the imaging device in order to produce successively and/or simultaneously a plurality of photoactive systems to be produced relatively to each other. Moving the imaging device involves, in particular, moving the imaging device substantially parallel with the first and/or second holding planes of the first and/or second holding device. It may also be preferred that moving the imaging device involves, in particular, moving the imaging device substantially orthogonally to the first and/or second holding planes of the first and/or second holding device. In particular, moving the imaging device involves translational and/or rotational movement of the imaging device relative to the first and/or second holding planes of the first and/or second holding device.

In another preferred embodiment, capturing the evaluation image in the at least one imaging arrangement includes the following steps: positioning the optical arrangement at infinity relative to the imaging device and/or the photoactive arrangement; and/or positioning the optical arrangement relative to the imaging device and/or the photoactive arrangement in a setpoint position and/or a setpoint orientation. In particular, the optical arrangement can be positioned relative to the imaging device and/or the photoactive arrangement in the setpoint position and/or the setpoint orientation by setting one or more offset values.

In another preferred development of the invention, evaluating the respective captured image includes the following steps: determining a frequency response characteristic of the captured evaluation image; and/or comparing the captured evaluation image with a captured evaluation image of a photoactive system previously adjusted and/or assembled in accordance with the method previously described; wherein, in particular, the evaluation images are captured simultaneously or sequentially in the respective at least one imaging arrangement; wherein, in particular, the comparison of the simultaneously captured evaluation images is based on a physical superimposition in the respective at least one imaging arrangement; and/or in particular the comparison of the simultaneously or sequentially captured evaluation images is based on virtual superimposition in the respective at least one imaging arrangement; and/or comparing the captured evaluation image and/or the determined frequency response characteristic of the captured evaluation image with a desired target state; and/or generating a control signal for moving the first and/or second holding device according to: the comparison of the captured evaluation image with a captured evaluation image of a photoactive system previously adjusted and/or assembled according to the method previously described and/or of the determined frequency response characteristic and/or of a determined offset; and/or the comparison of the captured evaluation image with a desired target state, if the captured evaluation image does not match the desired target state; and/or the comparison of the determined frequency response characteristic of the captured evaluation image with a desired target state, if the frequency response characteristic of the captured evaluation image does not match the desired target state.

It should be understood, in particular, that the method for producing is performed iteratively until the captured evaluation image and/or the determined frequency response characteristic of the captured evaluation image corresponds to the desired target state. The adjusting method of the photoactive system is preferably completed when the captured evaluation image and/or the determined frequency response characteristic of the captured evaluation image corresponds to the desired target state. If the captured evaluation image and/or the determined frequency response characteristic of the captured evaluation image does not match the desired target state, it is preferred in particular that the steps to adjust photoactive system are carried out again or repeatedly. In that respect, the method for adjusting a photoactive system should be understood, in particular, as a iterative method for adjusting a photoactive system.

A desired target state is a desired positioning of an optical arrangement relative to a photoactive arrangement of the photoactive system to be produced, in particular of the photoactive system to be adjusted. The desired target state is preferably a desired frequency response characteristic and/or a desired imaging sharpness that is to be achieved by means of the photoactive system to be produced, in particular by means of the photoactive system to be adjusted. The desired target state is preferably a target state range having an upper and different, lower, target state limit. In particular, the captured evaluation image and/or the frequency response characteristic of the captured evaluation image corresponds to the desired target state if the captured evaluation image and/or the frequency response characteristic of the captured evaluation image is within the desired target state range, in particular between the supper and lower target state limits.

This preferred embodiment includes, in particular, the step of simulating the one or more offset values. The one or more offset values are determined, in particular, before production of the photoactive system begins, for example by an optics designer. In a particularly advantageous manner, this preferred embodiment obviates the need for testing in accordance with the preferred embodiment previously described. In particular, the setpoint position and/or the setpoint orientation are the position and/or the orientation of the first holding device relative to the second holding device and/or relative to the at least one imaging arrangement in which the imaging sharpness of the evaluation image in the respective at least one imaging arrangement is at its maximum.

According to another preferred embodiment, the method is characterised in that the photoactive arrangement of the photoactive system to be produced is deactivated during adjustment and/or assembly and/or testing.

According to a third aspect of the invention, the object is achieved by the method according to claim 17.

The third aspect of the invention relates to the use of a device according to one of the preferred embodiments described above for producing a photoactive system, in particular for producing a deactivated photoactive system, an electro-optical and/or optoelectronic system, in for a projecting and/or imaging electro-optical system, including, in particular, the use of a device in one of the embodiments described above to adjust and/or assemble and/or test a photoactive system. A device according to one of the preferred embodiments described above can also be used to adjust and/or assemble and/or test a deactivated photoactive system.

With regard to the advantages, embodiments and detail of these further aspects of the invention and their developments, reference is also made to the preceding description regarding the respective features of the device for producing a photoactive system, and of the respective other aspects.

Embodiments of the invention shall now be described with reference to the drawings. These are not necessarily meant to show the embodiments according to scale; rather, the drawings are provided in schematic and/or slightly distorted form wherever this is helpful for the description. Reference is made to the relevant prior art for further details about technical principles that are not immediately evident from the drawings. Account should be taken of the fact that many modifications and changes may be made to the shape and details of a variant, without deviating from the general idea of the invention. The features of the invention disclosed in the description, in the drawings and in the claims may be essential, both separately and in any combination, for development of the invention. In addition, all combinations of at least two of the features disclosed in the description, the drawings and/or the claims fall within the scope of the invention. The general idea of the invention is not limited to the exact shape or detail of the preferred embodiments shown and described in the following, nor is it limited to subject-matter that would be limited in comparison to the subject-matter in the claims. When measurement ranges are specified, values within the specified limits are also disclosed as threshold values and may be applied and claimed at will. For the sake of simplicity, the same reference numerals are used in the following for identical or similar parts, or for parts which have identical or similar functions.

Further advantages, features and details of the invention are shown in the following description of the preferred embodiments and with reference to the drawings, in which FIG. 1 shows a schematic side view of a preferred embodiment of a device for producing a photoactive system;

Figure 1:
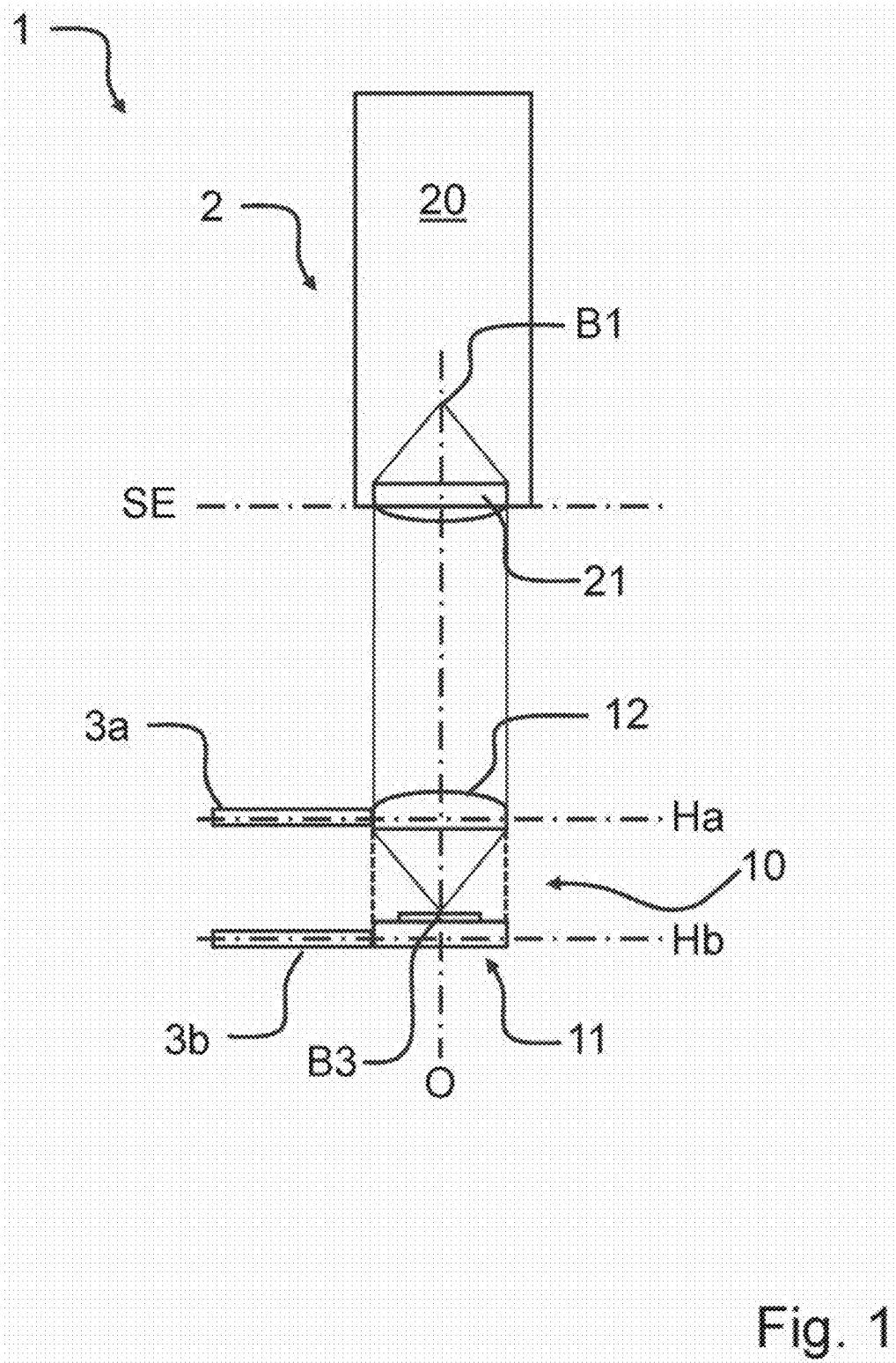
FIG. 1a shows a schematic side view of another preferred embodiment of a device for producing a photoactive system.
FIG. 1b shows a schematic side view of another preferred embodiment of a device for producing a photoactive system.
Figure 1A:
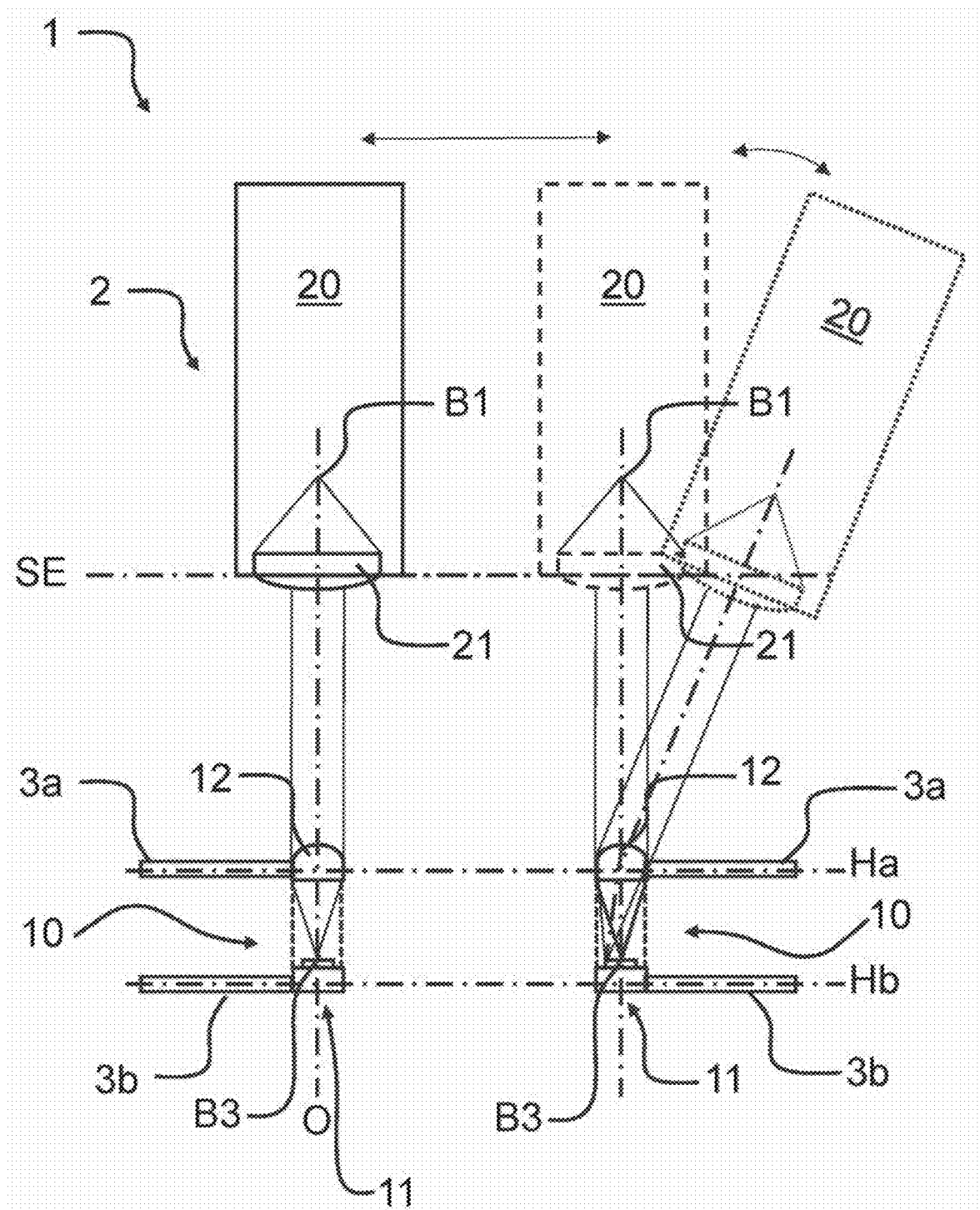
Figure 1B:
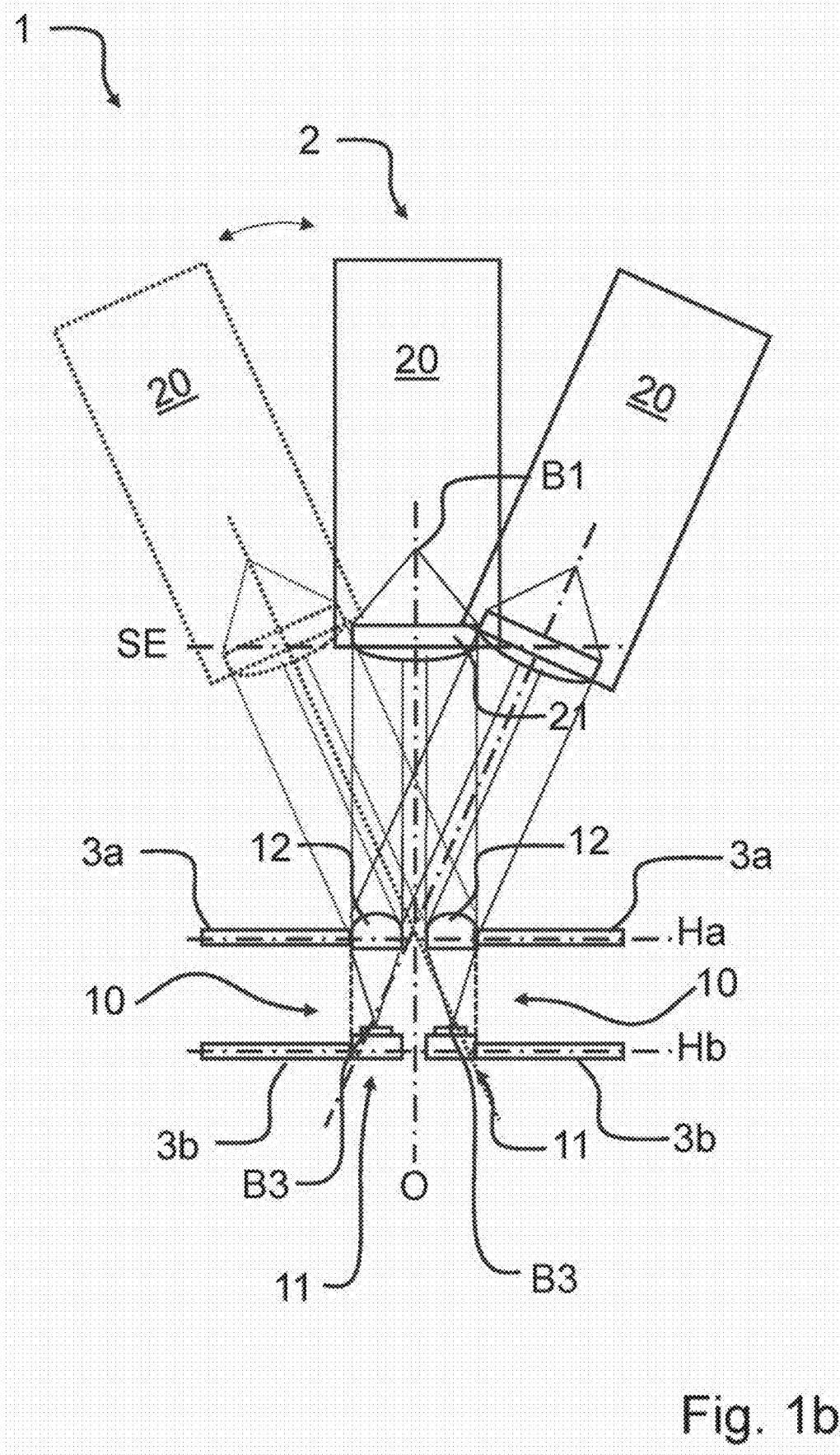
Figure 1C:
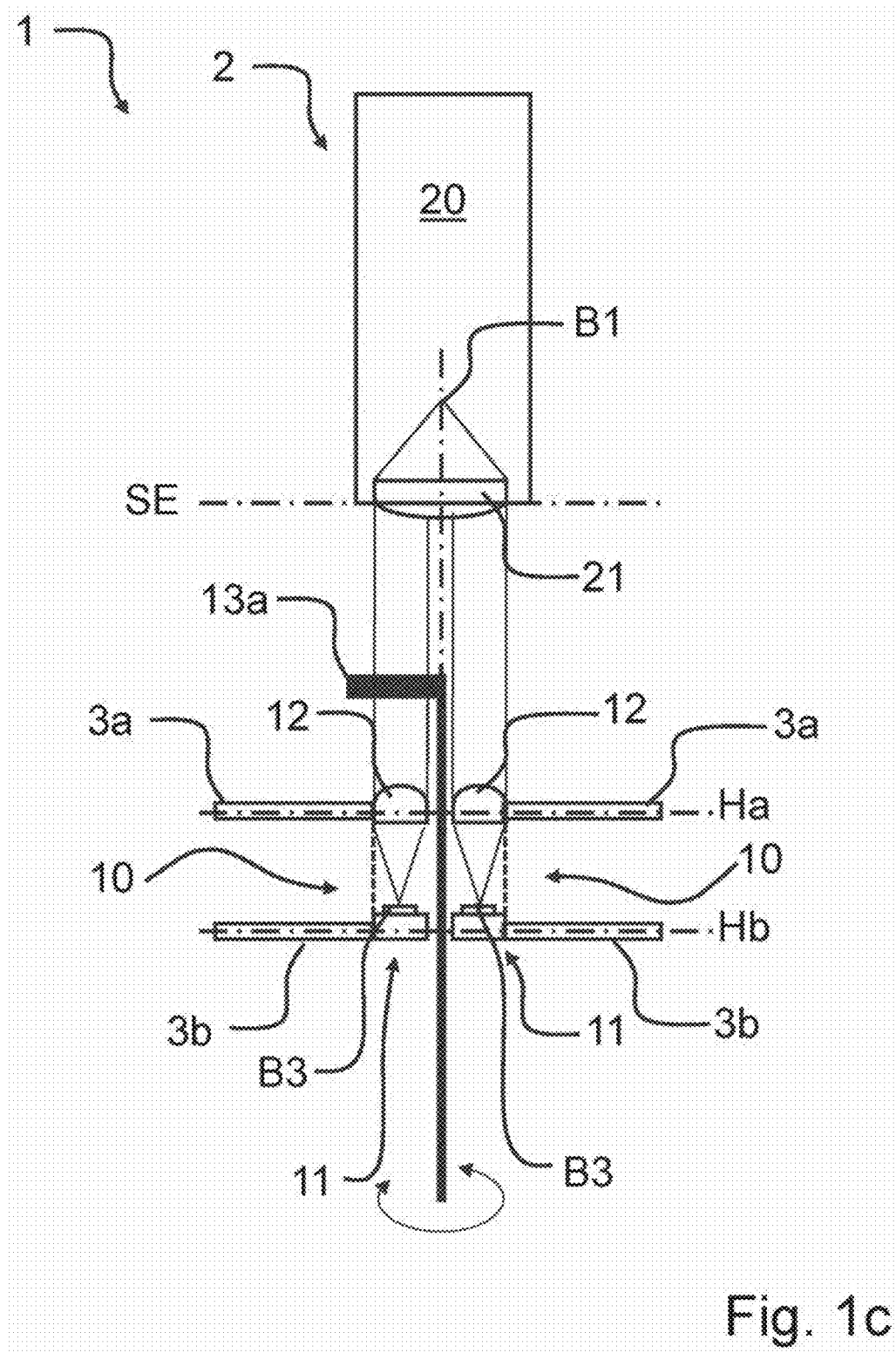
Figure 1D:
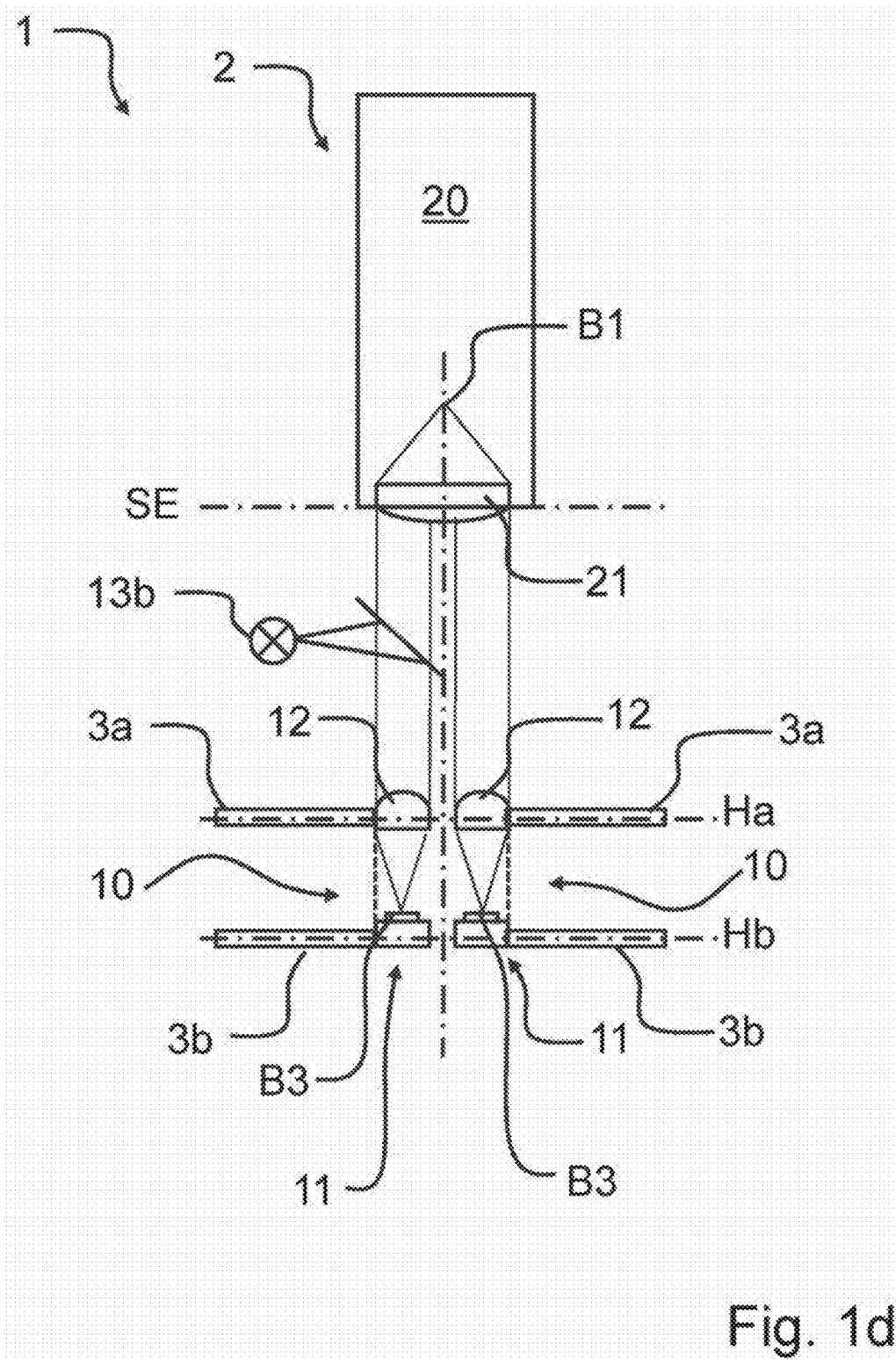
Figure 1E:
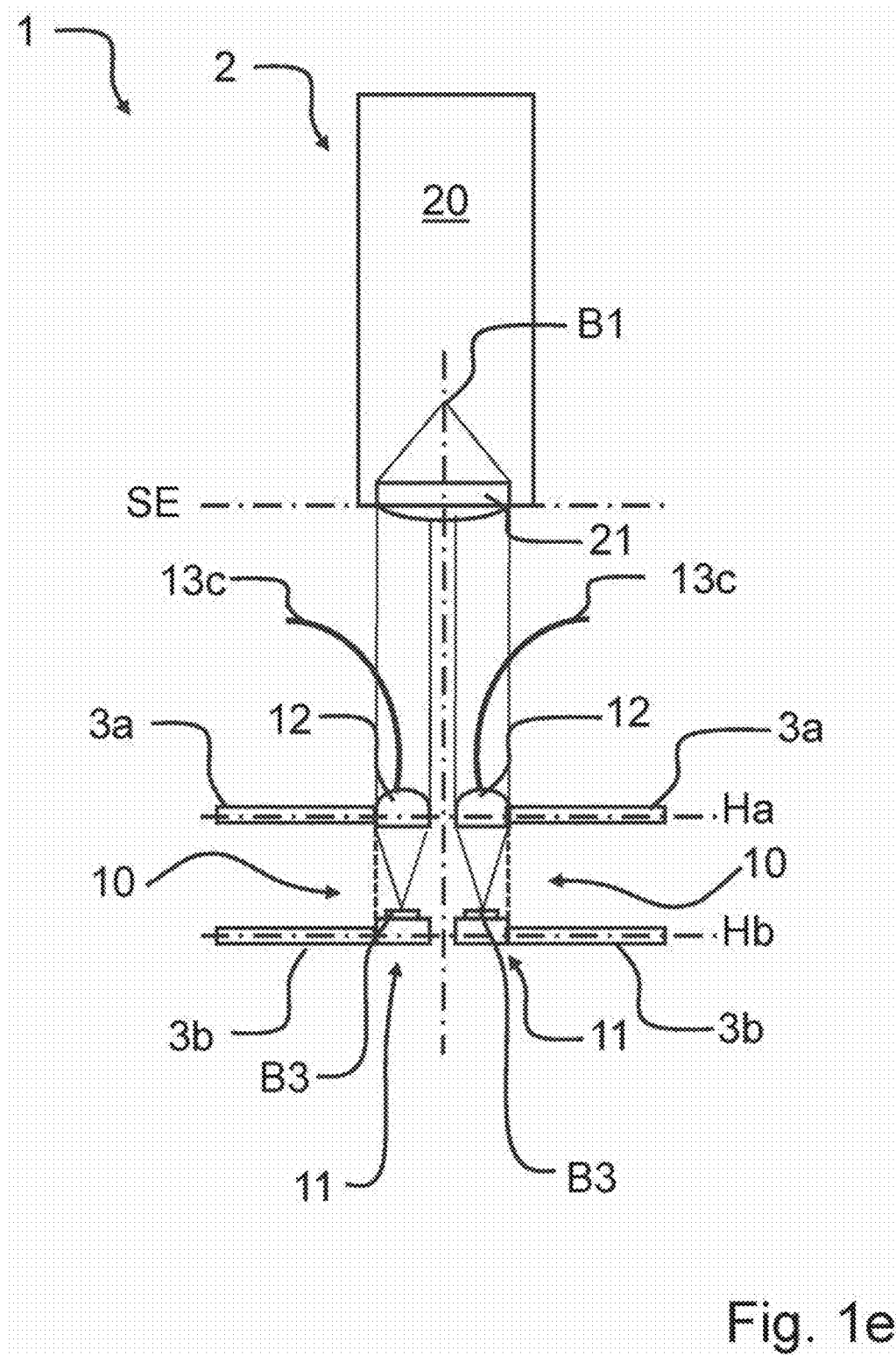
Figure 1F:
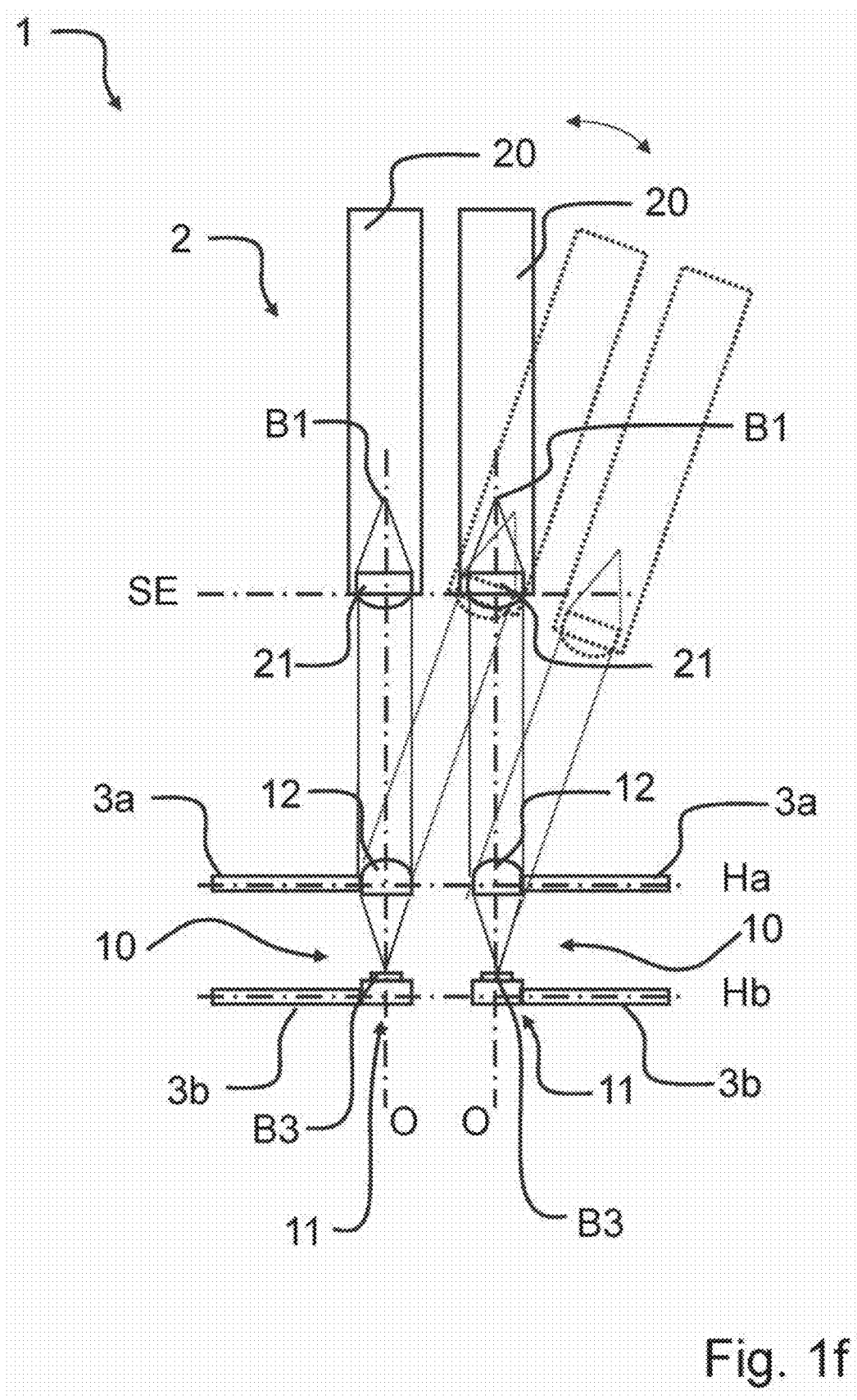
Figure 2:
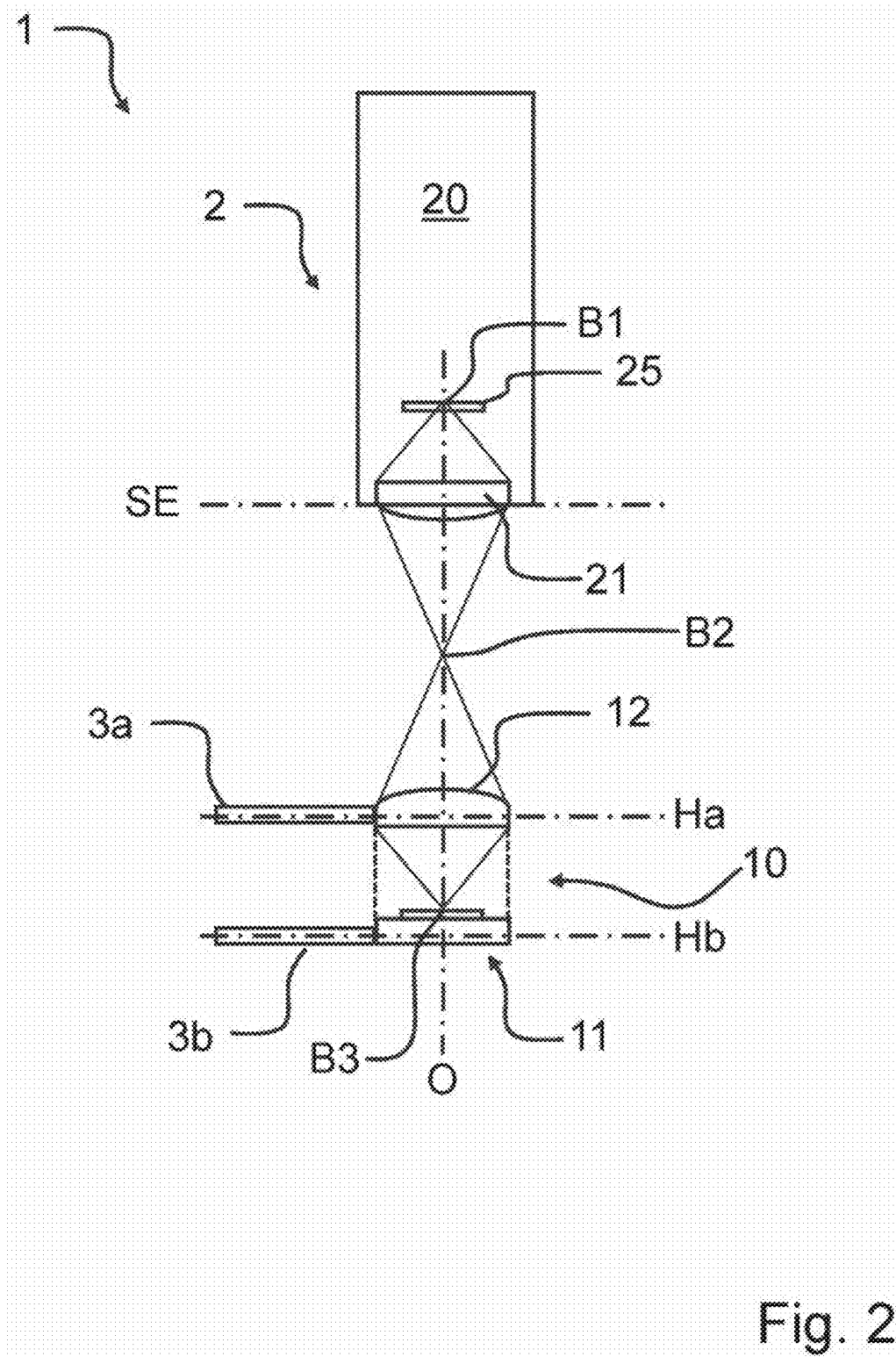
Figure 3:
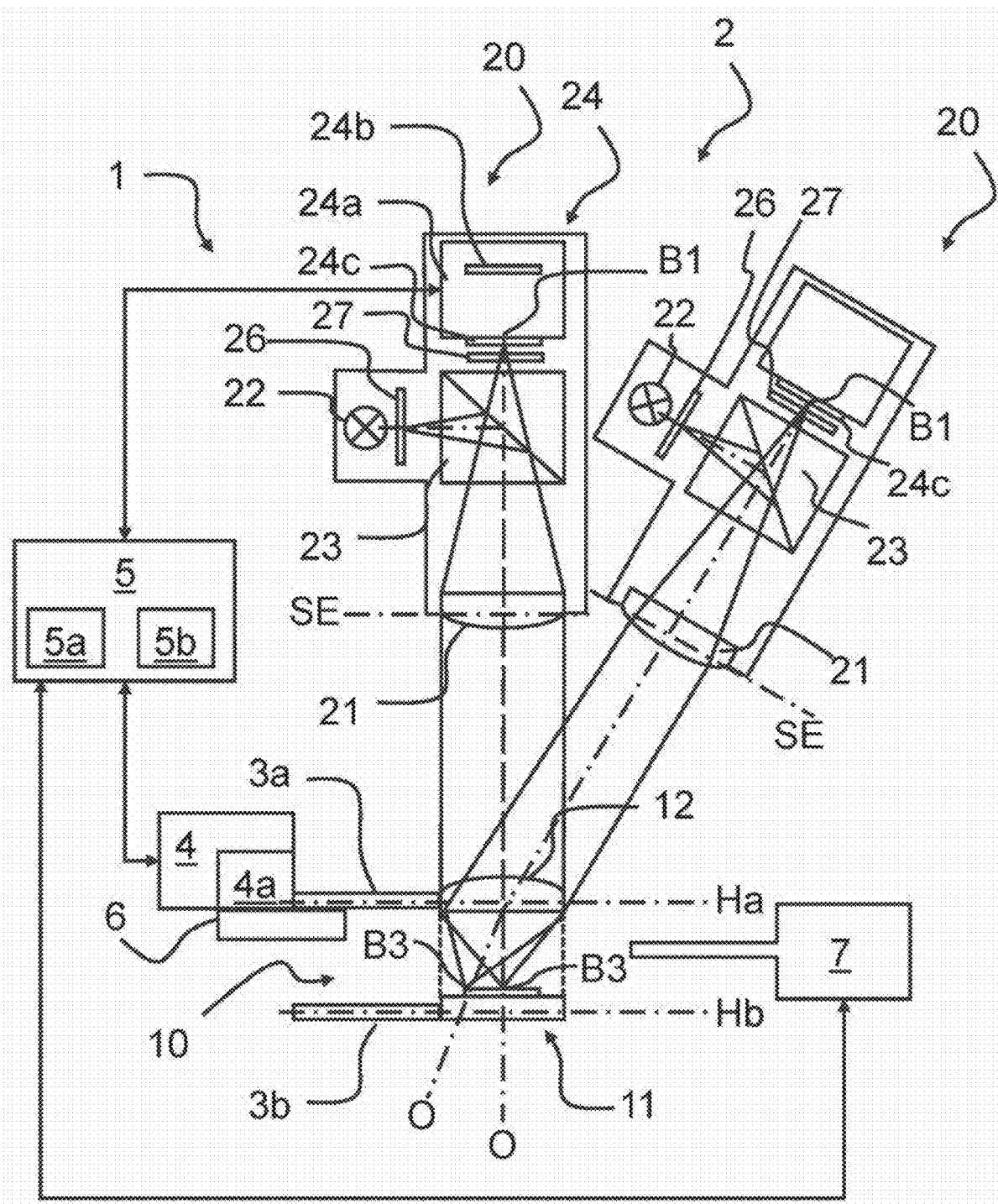
Figure 4:
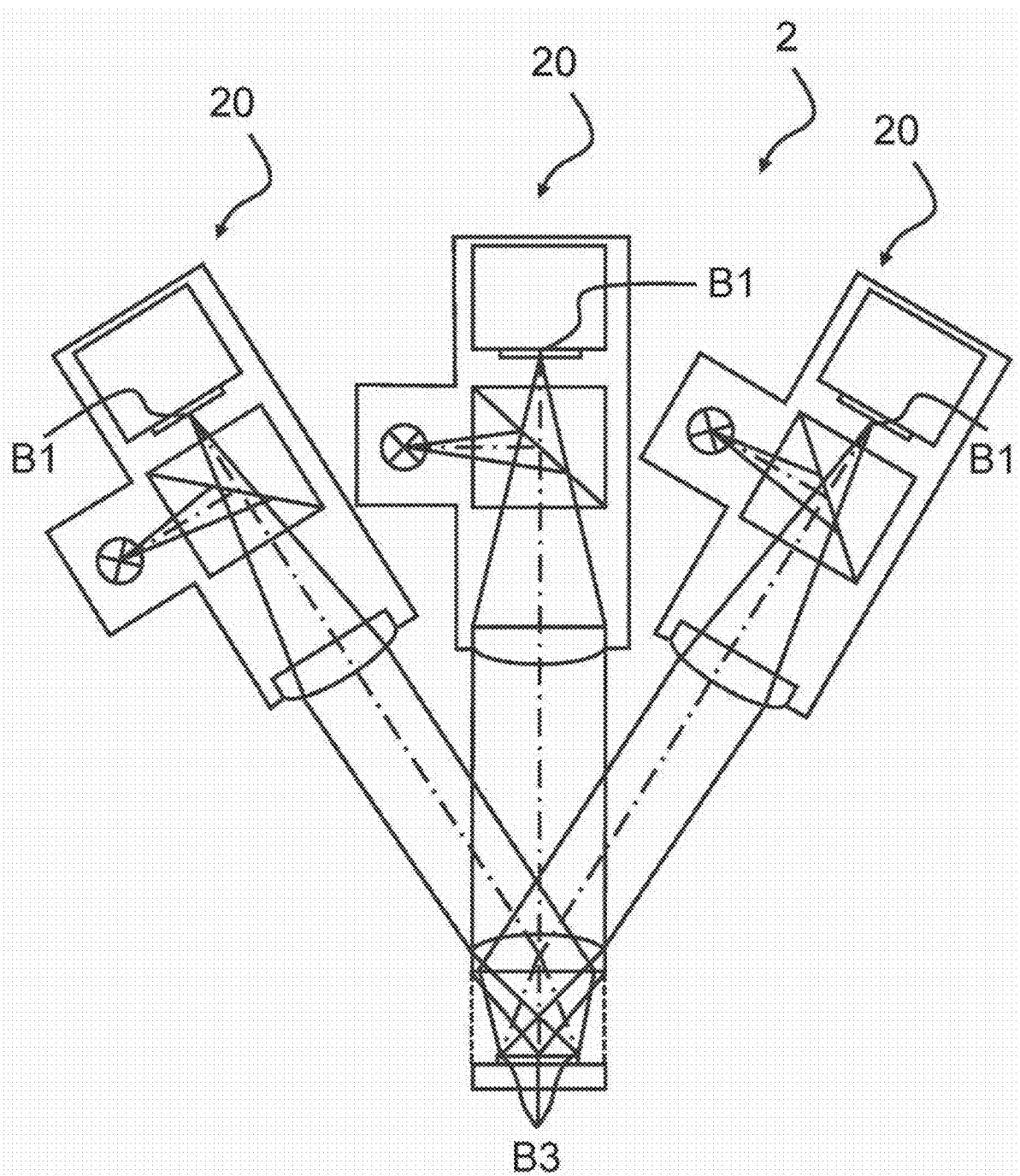
Figure 5:
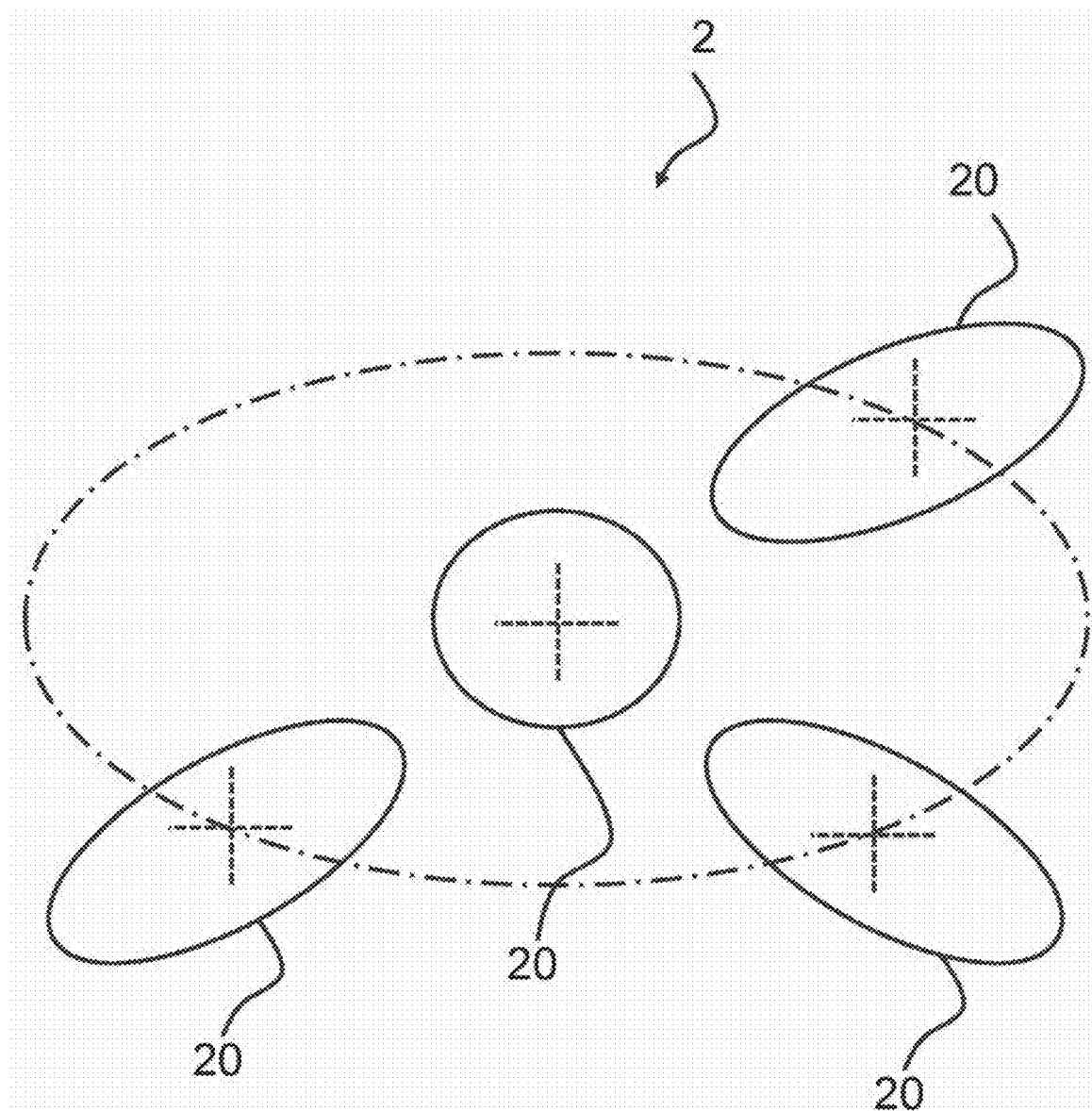
Figure 6:
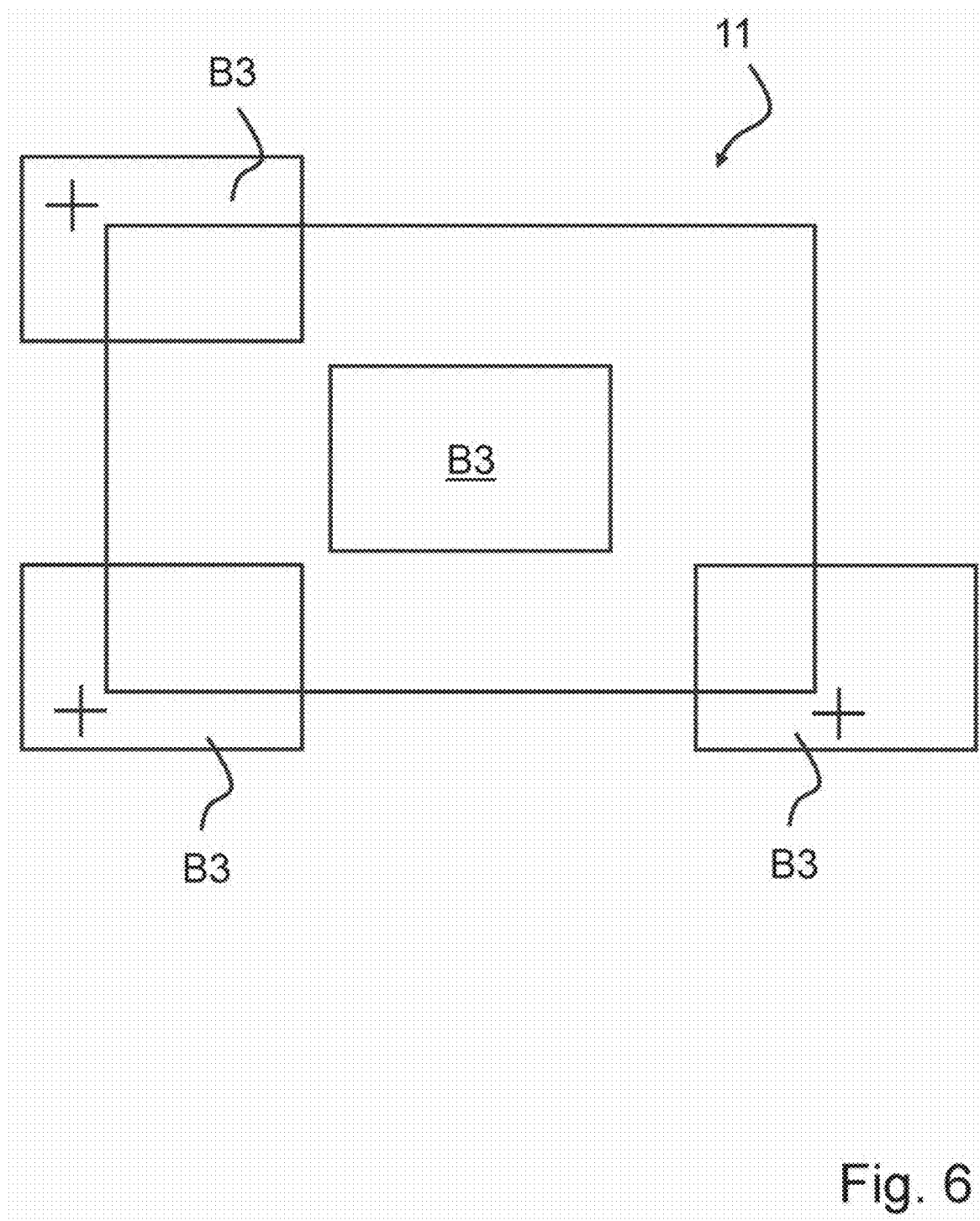
Figure 7:
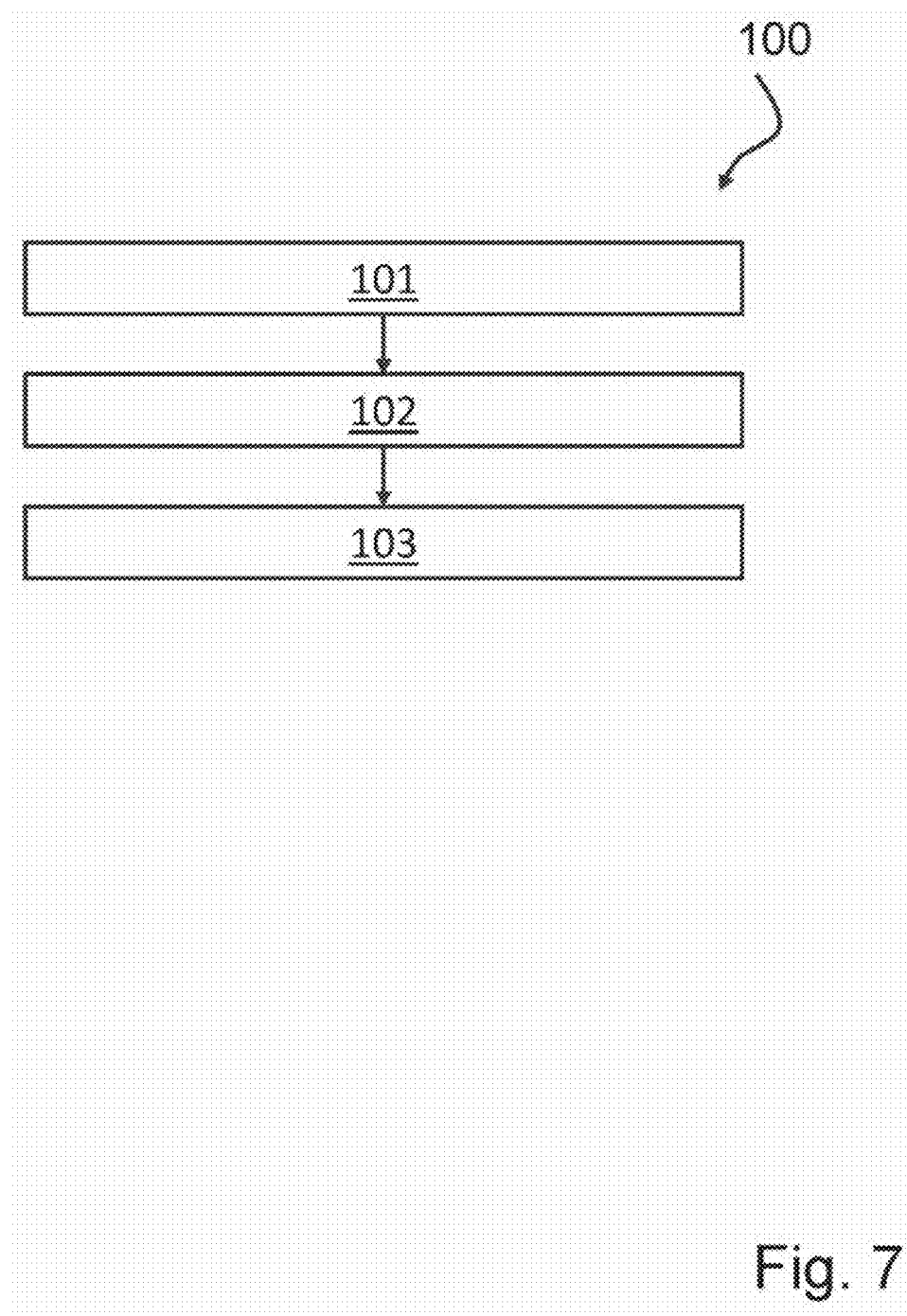
Figure 8:
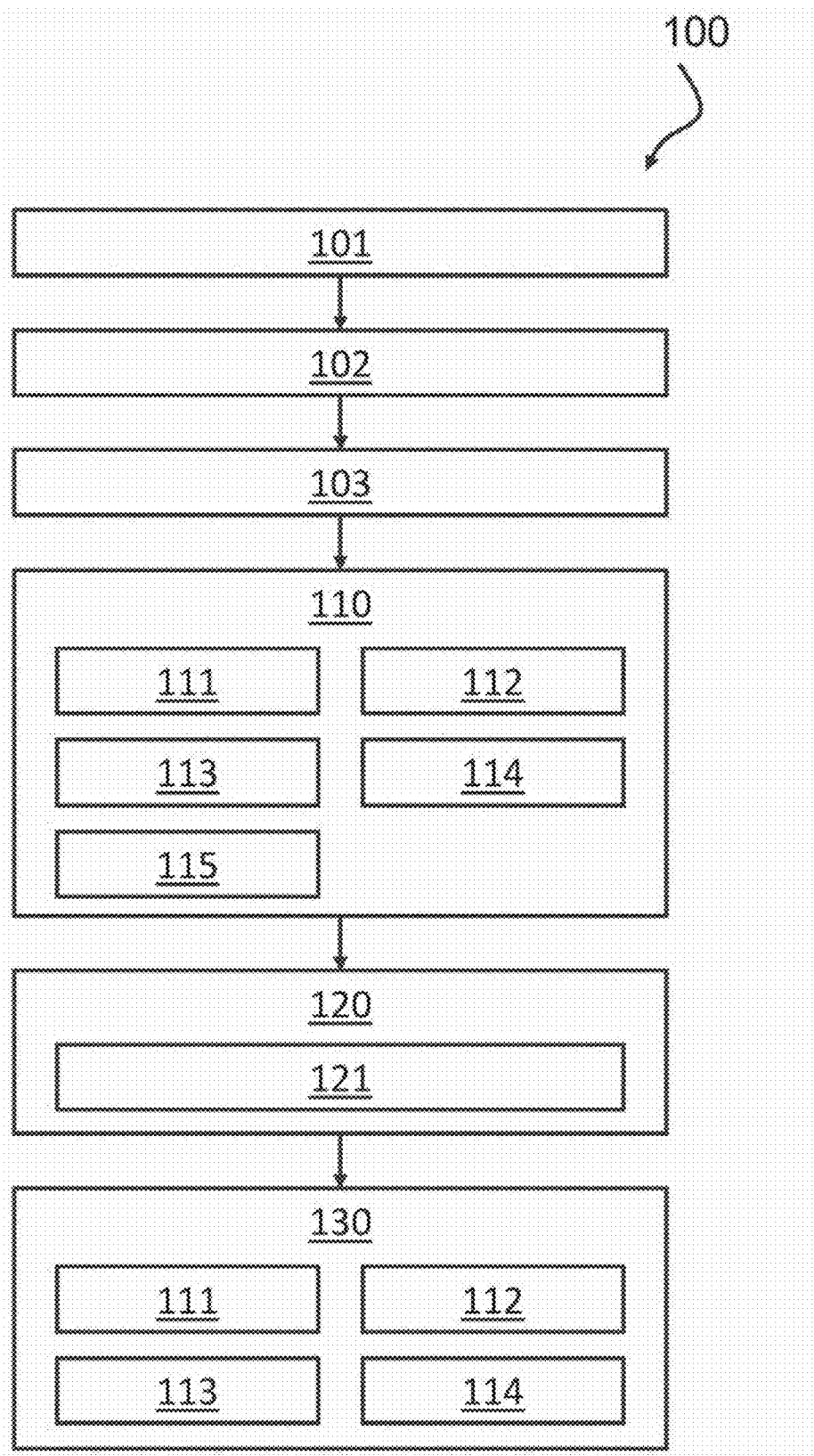

FIGS. 1c-e show a schematic view of various preferred embodiments for the alternating illumination of two photoactive systems to be produced;

FIG. 1f shows a schematic side view of another preferred embodiment of a device for producing a photoactive system;

FIG. 2 shows a schematic side view of another preferred embodiment for producing a photoactive system;

FIG. 3 shows a schematic side view of another preferred embodiment for producing a photoactive system;

FIG. 4 shows a schematic side view of another preferred embodiment for producing a photoactive system;

FIG. 5 a schematic top view of the preferred embodiment of the device shown in FIG. 4 for producing the photoactive system;

FIG. 6 shows a schematic top view of a photoactive arrangement of a photoactive system to be produced;

FIG. 7 shows a schematic flow diagram of a first preferred method for producing a photoactive system;

FIG. 8 shows a schematic flow diagram of another preferred method for producing a photoactive system;

FIG. 1 shows a schematic side view of a preferred embodiment of a device 1 for producing a photoactive system 10. Device 1, shown schematically, comprises an imaging device 2 and a first and second holding device 3a, 3b. In this preferred embodiment, imaging device 2 comprises a single imaging arrangement 20. This imaging arrangement 20 has a beam passage plane SE, in relation to which an optical axis O is arranged with a substantially orthogonal orientation. The first and second holding devices 3a, 3b each have a first and second holding plane Ha, Hb, which are oriented substantially parallel with beam passage plane SE. In particular, the first holding device 3a having the first holding plane Ha is spaced apart at a first distance A1 from beam passage plane SE. The second holding device 3b having the second holding plane Hb is spaced apart at a second distance A2 from the first holding plane Ha.

FIG. 1 shows device 1 in the operating condition. In the operating condition, a photoactive arrangement 11 of the photoactive system to be produced 10 and an optical arrangement 12 of the photoactive system 10 are already arranged in the respective holding device 3a, 3b. Optical arrangement 12 is arranged at infinity in relation to imaging device 2 and images photoactive arrangement 11 at infinity. In an upstream step, in the logistics condition of device 1, photoactive arrangement 11 and optical arrangement 12 were added to the respective holding device 3a, 3b. In order to produce a deactivated photoactive system, in particular, optical arrangement 12 and the photoactive arrangement are not contacted in the operating condition with one or more electronic contacts for power supply and/or data transmission. In the preferred embodiment shown schematically in FIG. 1, optical arrangement 12 is arranged in the first holding device 3a and photoactive arrangement 11 is arranged in the second holding device 3b. Both the first and the second holding device 3a, 3b are designed to hold optical arrangement 12 and/or photoactive arrangement 11. In the operating condition, optical arrangement 12 and/or photoactive arrangement 11 are arranged and accommodated force-fittingly and/or form-fittingly in the respective holding device 3a, 3b. The respective holding device comprises, for example, a clamp jaw gripper and/or a vacuum gripper for holding optical arrangement 12 and photoactive arrangement 11 in the respective holding device 3a, 3b.

The imaging arrangement 20 of device 1 shown schematically in FIG. 1 has an imaging module 21 which is arranged substantially on beam passage plane SE and concentrically with optical axis O. In this preferred embodiment, imaging module 21 is a converging lens. In the preferred embodiment shown in FIG. 1, imaging module 21 is designed to image electromagnetic beams at infinity along optical axis O in a direction of the first and second holding planes Ha, Hb. In a direction opposite thereto, away from the first and second holding plane Ha, Hb, imaging module 21 is designed to image electromagnetic beams at finity along optical axis O on a first focal plane B1 of imaging module 21.

In the present embodiment, optical arrangement 12 of the photoactive system 10 to be produced is a converging lens, and photoactive arrangement 11 of the photoactive system 10 to be produced is an image sensor arranged on a support. The first and second holding devices 3a, 3b are designed in such a way, in particular, that the converging lens 11 arranged in the respective holding devices 3a, 3b in the operating condition and image sensor 12 are arranged and held substantially in the respective holding plane Ha, Hb. In particular, the converging lens is designed to focus the electromagnetic beams emanating from imaging arrangement 20 on a third focal plane B3 in the direction of the second holding plane Hb. In particular, the image sensor of photoactive arrangement 11 is arranged and oriented on the second holding plane Hb. In order to produce the photoactive system in the operating condition, the first holding device 3a having converging lens 12 arranged therein and the second holding device 3b having photoactive arrangement 12 arranged therein are preferably oriented in relation to each other in such a way that the second distance A2 is substantially equal to the focal length of the converging lens 12 of the photoactive system 10 to be produced, i.e. the third focal plane B3 of converging lens 12 in the image sensor of photoactive arrangement 11 lies on the second holding plane Hb.

The imaging arrangement 20 shown schematically in FIG. 1 is designed to generate electromagnetic beams. The electromagnetic beams leave imaging arrangement 20 through the imaging module 21 arranged in beam passage plane SE. The imaging module 21 of imaging arrangement 20 is designed to image the electromagnetic beams at infinity. Imaging arrangement 20 is also designed to focus the electromagnetic beams reflected by the image sensor of photoactive arrangement 11 and focused at infinity in the direction of beam passage plane SE by converging lens 12, in order to focus an evaluation image on a first focal plane B1 by means of imaging module 21 and to capture the evaluation image. Depending on an imaging quality of the captured evaluation image, the first holding device 3*a* with converging lens 12 is adjusted in the operating condition with regard to its orientation and position in relation to the second holding device 3*b* having the image sensor of photoactive arrangement 11 disposed therein.

In order to adjust it, the first holding device 3*a* of device 1 shown schematically in FIG. 1 is movably positioned relative to imaging device 2 and the second holding device 3*b*, and imaging device 2 and the second holding device 3*b* are stationarily positioned. In particular, the first holding device 3*a* is translationally movable along optical axis O and rotationally movable about optical axis O. The first holding device 3*a* is also translationally movable along and rotationally movable about two other axes (not shown). Optical axis O and the two other axes are orthogonal to each other. The orientation and/or position of the converging lens relative to the image sensor can be adjusted by moving the first holding device 3*a* translationally along one of the three axes and/or by rotationally moving it about one of the three axes. If a desired imaging quality is achieved in an orientation and/or position of the photoactive arrangement 11 relative to optical arrangement 12, device 1 is designed to hold the first holding device 3*a* stationary in its orientation and/or position relative to the second holding device 3*b* for assembly purposes, i.e. for connecting optical arrangement 12 to photoactive arrangement 11.

FIGS. 1*a*-1*f* show preferred embodiments of the device. The preferred embodiments of the device shown in FIGS. 1*a*-1*f* are based on the embodiment of the device shown in FIG. 1. Unlike the embodiment shown in FIG. 1, the embodiments shown in FIGS. 1*a*-1*f* have two first holding devices 3*a* and two second holding devices 3*b*. The devices shown in FIGS. 1*a*-1*f* are designed to produce two photoactive systems.

The device 1 shown in FIG. 1*a* has a movable imaging device 2. Imaging device 2 is movable substantially parallel with the first and/or second holding plane Ha, Hb of the first and/or second holding device 3*a*, 3*b*. The photoactive system 10 shown on the left in FIG. 1*a* is firstly produced. Once the photoactive system on the left has been produced, imaging device 2 is moved to the right from a position on the left (continuous line) into a right-hand position (broken line) in order to produce the second photoactive system 10 relative to the first photoactive system already produced, shown on the left in FIG. 1*a*. To that end, an image stored by the photoactive system 10 already produced is virtually superimposed by an image of the photoactive system 10 still to be produced and, depending thereon, the photoactive system still to be produced is adjusted via the first and/or second holding device 3*a*, 3*b*.

The imaging device 2 shown in FIG. 1*a*, in particular the at least one imaging arrangement 20 of imaging device 2, can be orbitally pivoted relative to the photoactive system 10 to be produced. In the right-hand position (dotted line) in FIG. 1*a*, a pivoted imaging arrangement 20 is shown schematically.

The device 1 shown in FIG. 1*b* is so designed that two photoactive systems to be produced can be simultaneously captured by means of the imaging device. The imaging arrangement 20 of imaging device 2 is movable, in particular pivotable. FIG. 1*b* schematically shows an orbitally pivoted position for one of the two imaging arrangements 20 of imaging device 2 (dotted line). It may also be preferred, of course, that the second imaging arrangements 20 of imaging device 2 is also pivoted. In this preferred embodiment, a first photoactive system (on the left in FIG. 1*b*) is firstly produced, after which a second photoactive system to be produced (on the right in FIG. 1*b*) is imaged, without have to move imaging device 2 like in the embodiment shown in FIG. 1*a*. For that purpose, a first part of the at least one imaging arrangement 20 is aligned with the first photoactive system to be produced, and a second part of the at least one imaging arrangement 20 is aligned with a second photoactive system to be produced. The first and second parts of the at least one imaging arrangement 20 correspond, in particular, to a first and second subarea of a free aperture of the imaging module 21 of the respective imaging arrangement 20, in particular to a first and second subarea of a free aperture of an imaging arrangement 20 designed as a converging lens.

In order to produce the photoactive systems according to the device 1 shown in FIG. 1*b*, the left and the right photoactive systems are alternately illuminated, and the image of the left hand photoactive system already adjusted and/or assembled and the image of the right-hand photoactive system still to be produced are superimposed in the imaging device, in particular physically, and, depending thereon, the photoactive system to be adjusted and/or assembled is adjusted via the first and/or second holding device 3*a*, 3*b*. An imaging arrangement 20 of such an imaging device 2 preferably includes a converging lens as imaging element 21.

Based on an imaging device 2 with a single imaging arrangement 20, as an example, FIGS. 1*c*-1*e* show different preferred embodiments for alternately illuminating a first photoactive system (on the left in the Figure) and a second photoactive system (on the right in the Figure). This illumination concept is also applicable to devices 1, the imaging device 1 of which has two or more imaging arrangements 20 as shown schematically in FIG. 1*b*, for example.

FIG. 1*c* shows a preferred schematic embodiment of device of device 1 with a rotatingly mounted shading unit 13*a*. The rotatingly mounted shading unit 13*a* alternately covers the left-hand and the right-hand photoactive system from the electromagnetic beams generated by beam source unit 22 (not shown in FIG. 1*c*). FIG. 1*d* shows a preferred schematic embodiment of device 1, in which a beam source 13*b* is arranged outside imaging device 1 and the electromagnetic beams z of which are coupled coaxially in such a way between beam passage plane SE and the first holding plane Ha that it alternately illuminates the left-hand and the right-hand photoactive system. FIG. 1*d* shows a preferred schematic embodiment of device 1, in which the left-hand and the right-hand photoactive system are illuminated alternately by means of optical fibres 13*c*, the light from the optical fibres preferably being coupled to the optical arrangement 12 of the photoactive systems 10 to be produced.

The device 1 shown in FIG. 1*f* is designed to simultaneously capture two photoactive systems 10 to be produced. To that end, imaging device 2 in the device shown in this preferred embodiment has two imaging arrangements 20. In this preferred embodiment, the two imaging arrangements 20 are arranged substantially parallel with each other. In particular, the two imaging arrangements 20 of imaging device 2 are arranged in such a way that the optical axes O of the two imaging arrangements 20 are oriented substantially parallel with each other. The device shown in FIG. 1c includes two imaging arrangements 20, the optical axes O of which are oriented substantially orthogonally to the first and/or second holding plane. It should be understood that it may also be preferred that the two imaging arrangements with optical axes O are arranged at a slant relative to the first and/or second holding plane Ha, Hb. In this slanted orientation of the two imaging arrangements 20, their optical axes O are oriented parallel to each other. FIG. 1f shows schematically a pivoted position of imaging device 2 (dotted line).

With the device 1 shown in FIG. 1f, it is possible, in particular, to produce two photoactive systems simultaneously. However, by means of a device 1 which includes more than two imaging arrangements 20 and more than two first and second holding devices 3a, 3b, it is also possible, to produce more than two photoactive systems.

In order to produce two or more photoactive systems, images of the photoactive systems to be produced are captured. In order to produce the photoactive system still to be produced and/or assembled, an image of the photoactive system still to be produced is virtually superimposed by an image of the photoactive system already produced. The orienting of the photoactive system 10 still to be produced and/or assembled, in particular of the first and/or second holding device relative to the photoactive system already produced, is carried out simultaneously. This has the advantage that there is no need to store the images, and production time is saved.

FIG. 2 shows another preferred embodiment of device 1 for producing a photoactive system. This preferred embodiment of device 1 is based on the preferred embodiment of device 1 shown schematically in FIG. 1, whose imaging arrangement 20 is focused by means of the imaging module at infinity in the direction of the first or second holding plane Ha, Hb. Unlike the device 1 shown schematically in FIG. 1, the device 1 shown schematically in FIG. 2 includes an imaging arrangement 20 having an imaging module 21 which focuses at finity in the direction of the first or second holding plane Ha, Hb on a second focal plane B2. The device 1 shown schematically in FIG. 2 is suitable, in particular, for producing a photoactive system which has an optical arrangement 12 that, arranged in the first holding device in the operating condition, focuses the electromagnetic beams reflected by photoactive arrangement 11 towards beam passage plane SE on a focal plane. In this device 1, the first holding device 3a having optical arrangement 12 arranged therein in the operating condition is positioned relative to the imaging arrangement such that the focal plane of the optical arrangement in the direction of beam passage plane SE corresponds to the second focal plane B2. The preferred embodiment shown schematically in FIG. 2 also has a test structure device 25. Such an embodiment is suitable, in particular, for producing photoactive systems 10 that include a low-contrast or reflecting photoactive arrangement 11. Normally, in the preferred embodiment shown, the electromagnetic beam is preferably split for illumination and for work with the test structure (not shown).

The further preferred embodiment of a device 1 shown schematically in FIG. 3 comprises an imaging device 2, a first and second holding device 3a, 3b, an adjusting device 4, an evaluation device 5, a support device 6 and a joining device 7.

The preferred embodiment of a device 1 for producing a photoactive system 10, shown schematically in FIG. 3, includes an imaging device 2 having two identical imaging arrangements 20. A first imaging arrangement 20 is positioned according to the imaging arrangement 20 of the preferred embodiment of device 1 shown schematically in FIG. 1. In particular, the first and second holding device 3a, 3b having the first and second holding plane Ha, Hb are positioned according to the preferred embodiment shown schematically in FIG. 1. A second imaging arrangement 20 of imaging device 2 is positioned at an angle relative to the first imaging arrangement 20, in particular relative to the first and/or second holding plane Ha, Hb of the respective holding device 3a, 3b. The two imaging arrangements 20 comprise an imaging module 21, a beam source unit 22, a beam splitter unit 23, and an image capturing unit 24. Image capturing unit 24 comprises a camera 24a, power electronics 24b and an image sensor 24c.

In this preferred embodiment, beam source unit 22 is a point source of electromagnetic beams of visible light. In this preferred embodiment, beam source unit 22 can also emit non-visible light. In the operating condition, the electromagnetic beams generated by beam source unit 22 strike beam splitter unit 23. A diffuser unit 26 for scattering the electromagnetic beams is positioned between beam splitter 23 and beam source unit 22. Beam splitter unit 23 is positioned between imaging module 21 and image capturing unit 24. Beam splitter unit 23 deflects part of the electromagnetic beams towards imaging module 21. The electromagnetic beams generated by beam source unit 22 and deflected by beam splitter unit 23 exit imaging arrangement 20 through imaging module 21 arranged on beam passage plane SE. In the present preferred embodiment of device 1, imaging module 21 is designed to focus at infinity the electromagnetic beams emanating from the imaging arrangement. The optical arrangement 12 of the photoactive system to be produced focuses the electromagnetic beams focused at infinity on the photoactive arrangement, as previously described for the preferred embodiment of device 1 shown schematically in FIG. 1.

The imaging module 21 of imaging arrangement 20 is also designed to focus, on a first focal plane B1, the electromagnetic beams reflected in the operating condition by photoactive arrangement 12. In the preferred embodiment of device 1 shown schematically in FIG. 2, the image capturing unit 24 of the imaging arrangement is arranged in such a way that an image sensor 24c of image capturing unit 24 is positioned relative to imaging module 21 in such a way that an image sensor 24c of image capturing unit 24 lies on the first focal plane B1 of imaging module 21. The image sensor 24c of image capturing unit 24 captures the evaluation image of electromagnetic beams reflected by photoactive arrangement 11. A filter unit 27 for filtering electromagnetic beams of a particular wavelength is provided between beam splitter unit 23 and the image capturing unit. It is preferred, in particular, that filter unit 27 allows short-wave electromagnetic beams, in particular beams in a narrow wavelength band only, to pass in the direction of the image capturing unit. This advantageously increases the imaging sharpness or a contrast of the respective evaluation image. Power electronics module 24b may be designed, in particular, to determine an imaging quality of the captured evaluation image and, depending on the determined imaging quality, to provide one or more control signals for controlling adjusting device 4. It may be preferred that the power electronics module 24b is coupled directly in signal communication with the adjusting device (not shown). In particular, power electronics module 24b can calculate the control signal using a conventional autofocus function of an image capturing unit 24 and provide it to adjusting device 4.

In the preferred embodiment of device 1 shown schematically in FIG. 3, evaluation device 5 has an integrated electronic circuit 5a and a control unit 5b. Power electronics module 24b is designed to determine an imaging quality of the captured evaluation image and, depending on the determined imaging quality, to provide one or more control signals for controlling adjusting device 4. The control unit is designed to transmit the one or more control signals to the adjusting device 4 coupled in signal communication. Adjusting device 4 comprises a drive means 4a which preferably comprises one or more piezoelectric or electromagnetic actuators. In this preferred embodiment, other actuators would preferably be possible in addition or alternatively. Drive means 4a drives the first holding device 3a in response to the one or more control signals. Depending on the control signals, the orientation and/or position of the first holding device 3a is changed relative to the second holding device 3b until the evaluation image of photoactive arrangement 11 of the photoactive system 10 to be produced is adjusted in such a way relative to the optical arrangement 12 of the photoactive system 10 to be produced that a desired imaging quality is determined.

To adjust the first holding device 3a relative to the second holding device 3b, the preferred embodiment of device 1 shown schematically in FIG. 3 includes a support device which is designed to support the first holding device 3a in such a way that, in the operating condition, the first holding device 3a can move the optical arrangement translationally along three axes oriented orthogonally to each other and rotationally about said three axes. It may be preferred for adjustment purposes that the first holding device 3a is translationally adjustable and that the second holding device is rotationally adjustable, or vice versa. It may also be preferred that both holding devices 3a, 3b have up to six degrees of freedom.

The joining device is designed to assemble the adjusted photoactive system 10. In particular, the joining device is designed to joiningly connect the optical arrangement 12 of the adjusted photoactive system 10 to the photoactive arrangement 11 of the adjusted photoactive system 10 in the operating condition.

The preferred embodiment of device 1 shown schematically in a side view in FIG. 4 and in a top view in FIG. 5 includes an imaging device 2 having four identical imaging arrangements 20. A first imaging arrangement 20 is positioned according to the imaging arrangement 20 of the preferred embodiment of device 1 shown schematically in FIG. 1. In particular, the first and second holding device 3a, 3b having the first and second holding plane Ha, Hb are positioned according to the preferred embodiment shown schematically in FIG. 1. The three other imaging arrangements 20 are arranged at an angle relative to the first imaging arrangement 20, preferably on a circular path (dashed/dotted line in FIG. 5).

FIG. 6 shows a schematic top view of a photoactive arrangement 11 of a photoactive system 10 to be produced. The photoactive arrangement shown in FIG. 6 is produced by means of a device 1 according to FIGS. 4 and 5. The top view of photoactive arrangement 11 shows schematically the third focal plane B3 which is assigned to an imaging arrangement 20 of the device shown schematically in each of FIGS. 4 and 5. The respective third focal plane B3 is the respective image capture region of the four imaging arrangements 20, which is captured in order to generate the respective evaluation image and its evaluation. The crosses arranged in the image capture regions are adjustment marks which have been physically inserted immediately adjacent to the photoactive arrangement.

A device 1 shown schematically in FIGS. 4-6 allows photoactive arrangement 11 to be adjusted relative to optical arrangement 12. To that end, a rough adjustment can firstly be made orthogonally to the focal plane B3 shown in FIG. 6 at the centre of the photoactive arrangement 11. When roughly focused, the distance between optical arrangement 12 and photoactive arrangement 11 is roughly adjusted. Based on the three adjustment marks, photoactive arrangement 11 is translationally oriented relative to optical arrangement 12 along the two axes. Photoactive arrangement 11 can then be oriented about two orthogonally oriented axes lying on focal plane B3. To that end, the imaging sharpness in the edge regions of photoactive arrangement 11 is preferably captured and the photoactive arrangement is adjusted, i.e. is rotated about said two axes, until the imaging sharpness in the edge regions is at least similar and preferably substantially identical. The aim, in particular, when performing the adjustment, is to achieve symmetry of the modulation transfer function of the respective edge region. It may also be preferred that the two aforementioned steps be performed in reverse order. Fine adjustment may then be preferred. When making the fine adjustment, the modulation transfer function is determined, in the present embodiment, in the four image capture regions and the value of the modulation transfer function is finely adjusted depending on preferences. It may be preferred that photoactive arrangement 11 be adjusted relative to optical arrangement 12 in such a way during fine adjustment that the imaging sharpness of imaging arrangement 20 is maximised for the central image capture region. However, it may also be preferred that photoactive arrangement 11 be finely adjusted relative to optical arrangement 12 in such a way that the imaging sharpness of one or more imaging arrangements 20 that capture one of the edge regions of photoactive arrangement 11 is maximised.

FIG. 7 shows a schematic flow diagram of a first preferred embodiment of a method 100 for producing a photoactive system 10. This preferred embodiment of method 100 is suitable, in particular, for producing a deactivated photoactive system 10. The preferred embodiment includes the step of providing 101 a device 1 for producing a photoactive system 10, for example one of the preferred embodiments of device 1 described in the foregoing and shown schematically in FIGS. 1-6. The preferred embodiment of method 100 includes, as a further step, providing and arranging 102 a photoactive arrangement 12 in the second holding device 3b. The preferred embodiment of method 100 includes the further step of providing and arranging 103 an optical arrangement 12 in a first holding device 3a. This preferred embodiment feeds photoactive arrangement 11 and optical arrangement 12 of the photoactive system 10 to be produced to device 1. To that end, photoactive arrangement 11 and optical arrangement 12 are to be fed to the respective holding device 3a, 3b. The flow diagram shown schematically in FIG. 7 describes the logistics condition of device 1.

The flow diagram shown schematically in FIG. 8 shows another preferred embodiment of method 100. This preferred embodiment of method 100 is based on the preferred embodiment of method 100 shown in FIG. 7. In addition to the steps of: providing 101 a device 1 for producing a photoactive system 10; providing and arranging 102 a photoactive arrangement 12 in the second holding device 3b; and providing and arranging 103 an optical arrangement 12 in a first holding device 3a, the method in the preferred embodiment shown schematically in FIG. 8 includes the steps of adjusting 110 the optical arrangement relative to the photoactive arrangement; and/or assembling 120 the optical arrangement adjusted relative to the photoactive arrangement; and/or testing 130 the optical arrangement assembled relative to the photoactive arrangement.

The step of adjusting 110 may include one or more subordinate steps. A first preferred subordinate step in adjusting 110 is to provide 111 an electromagnetic beam for imaging an evaluation image of the photoactive arrangement 11 of the photoactive system 10 to be produced, or of the test structure. Another optional subordinate step in adjusting 110 is to image 112 the evaluation image of the photoactive arrangement 11 of the photoactive system 10 to be produced 10 on the beam passage plane (SE) of the at least one imaging arrangement 20. The step of adjusting 110 may include capturing 113 the evaluation image on the beam passage plane SE of the at least one imaging arrangement 20. In particular, the method of adjusting 110 includes evaluating 114 the captured evaluation image. Finally, a fifth preferred subordinate step in adjusting 110 is to move 115 the first holding device 3a with optical arrangement 12 disposed therein and/or the second holding device 3b with photoactive arrangement 11 disposed therein, depending on the evaluation of the captured evaluation image. The steps of adjusting 110 are preferably performed iteratively.

The step of assembling 120 includes, in particular, the step of connecting the optical arrangement 12 to the photoactive arrangement 11 of the photoactive system 10 to be produced. In particular, it may be necessary when carrying out the step of assembling 120 or adjusting to take into account any shrinkage of the connection or the like during assembly, by providing an offset that compensates for the shrinkage. Shrinkage of the connection results, for example, from heat input, for example during soldering or welding or gluing. When gluing, such shrinkage ensues, for example, during the phase transition from a liquid to a solid aggregate state of an adhesive used for gluing.

The step of testing 130 includes one or more optional subordinate steps. The step of testing 130 includes, in particular, providing 111 an electromagnetic beam for imaging an evaluation image of the photoactive arrangement 11 of the photoactive system 10 to be produced. Testing 130 also includes imaging 112 the evaluation image of the photoactive arrangement 11 of the adjusted and/or assembled photoactive system 10, or of the test structure, on the beam passage plane SE of the at least one imaging arrangement 20. Testing 130 may also include capturing 113 the evaluation image of the at least one imaging arrangement 20. It is preferred, in particular, that testing includes evaluating 114 the captured evaluation image as a subordinate step.

The step of evaluating 114 the respective captured evaluation image includes the following steps in particular: determining a frequency response characteristic of the captured evaluation image; and/or comparing the captured evaluation image with a captured evaluation image of a photoactive system already adjusted and/or assembled according to the method previously described; wherein, in particular, the evaluation images are captured simultaneously or sequentially in the respective at least one imaging arrangement 20; wherein, in particular, the comparison of the simultaneously captured evaluation images is based on a physical superimposition in the respective at least one imaging arrangement 20; and/or in particular the comparison of the simultaneously or sequentially captured evaluation images is based on virtual superimposition in the respective at least one imaging arrangement 20; and/or comparing the captured evaluation image and/or the determined frequency response characteristic of the captured evaluation image with a desired target state.

The step of evaluating 114 the respective captured evaluation image includes, in particular, generating a control signal for moving the first and/or second holding device. The control signal is generated, in particular, according to a comparison of the captured evaluation image with a captured evaluation image of a photoactive system already adjusted and/or assembled according to the previously described method and/or according to a determined frequency response characteristic and/or a determined offset; and/or according to a comparison of the captured evaluation image with a desired target state, if the captured evaluation image does not match the desired target state; and/or according to a comparison of the determined frequency response characteristic of the captured evaluation image with a desired target state, if the frequency response characteristic of the captured evaluation image does not match the desired target state.

It may also be preferred that the method preferably includes the further step of moving imaging device 2 (not shown), in order to successively and/or simultaneously produce a plurality of photoactive systems 10 to be produced relatively to each other.

LIST OF REFERENCE SIGNS

1 Device for producing a photoactive system
2 Imaging device
3a/3b First and second holding device
4 Adjusting device
4a Drive means
5 Evaluation device
5a Integrated electronic circuitry
5b Control unit
6 Support device
7 Joining device
10 Photoactive system
11 Photoactive arrangement
12 Optical arrangement
13a Shading unit
13b Beam source
13c Optical fibre
20 At least one imaging arrangement
21 Imaging module
22 Beam source unit
23 Beam splitter unit
24 Image capturing unit
24a Camera
24b Power electronics module
24c Image sensor
25 Test pattern device
26 Diffuser unit
27 Filter unit
100 Method for producing a photoactive system
101 Providing a device for producing a photoactive system
102 Providing and arranging a photoactive arrangement in the second holding device
103 Providing and arranging an optical arrangement in the first holding device
110 Adjusting the optical arrangement in relation to the photoactive arrangement 111 Providing a beam for imaging an evaluation image of the photoactive system to be produced
112 Imaging the evaluation image of the photoactive system to be produced on the beam passage plane of the at least one imaging arrangement
113 Capturing the evaluation image on the beam passage plane of the at least one imaging arrangement
114 Evaluating the captured evaluation image, and/or
115 Moving the first holding device and/or the second holding device according to the evaluation of the captured evaluation image
120 Assembling the optical arrangement adjusted in relation to the photoactive arrangement
121 Connecting, in particular joining the optical arrangement to the photoactive arrangement
130 Testing the optical arrangement assembled in relation to the photoactive arrangement
A1/A2 First and second distance
SE Beam passage plane
Ha/Hb First and holding plane
O Optical axis

The invention claimed is:

1. A device for producing at least two photoactive systems in one of an electro-optical and an optoelectronic system, wherein each photoactive system to be produced comprises at least one optical arrangement and at least one photoactive arrangement, said device being characterised by:
   an imaging device having at least one imaging arrangement, wherein the at least one imaging arrangement has a beam passage plane and an optical axis, and the at least one imaging arrangement is designed
      to generate electromagnetic beams which extend along a beam path and pass through the imaging arrangement in a beam passage plane and
      to image, on a first focal plane of the imaging arrangement, an evaluation image of electromagnetic beams reflected at the photoactive arrangement and
      to capture the evaluation image imaged on the first focal plane; and
   a first holding device having a first holding plane for simultaneously holding, on the first holding plane, the at least two optical arrangements of the at least two photoactive systems to be produced; and
   a second holding device having a second holding plane for simultaneously holding, on the second holding plane, the at least two photoactive arrangements of the at least two photoactive systems to be produced;
   wherein at least one of the first holding device having the first holding plane and the second holding device having the second holding plane is/are movably positioned relative to the imaging device; and
   the imaging device is designed to be at least one of
      movable in a translational manner relative to at least one of the first and second holding planes of a respective one of the first and second holding device, and
      movable in a rotatory manner relative to at least one of the first and second holding planes of a respective one of the first and second holding device.

2. The device according to the preceding claim 1, characterised in that the first holding device is arranged between the second holding device and the imaging device.

3. The device according to claim 1, wherein the first and/or second holding device is designed to accommodate two or more optical arrangements and/or two or more photoactive arrangements, wherein the first holding device is preferably designed to move two or more optical arrangements rotationally and/or translationally independently of each other; and/or
the second holding device is preferably designed to move two or more photoactive arrangements rotationally and/or translationally independently of each other.

4. The device according to claim 1, characterised in that
a first part of the at least one imaging arrangement is aligned with a first photoactive system to be produced and a second part of the at least one imaging arrangement is aligned with a second photoactive system to be produced; and/or
the imaging device has two imaging arrangements, wherein said two imaging arrangements are arranged in such a way that their optical axes extend parallel with one another, wherein one of said two imaging arrangements is aligned with a photoactive system to be produced and another of the two imaging arrangements is aligned with another photoactive system to be produced.

5. The device according to claim 1, characterised in that the first holding plane of the first holding device is arranged substantially parallel with respect to the beam passage plane of at least one imaging arrangement and/or is arranged non-parallel at a distance from the beam passage plane of at least one other of the at least one imaging arrangement.

6. The device according to claim 1, characterised in that the at least one imaging device comprises:
an imaging module in which the beam passage plane is arranged and which has the optical axis, wherein the imaging module is designed
   to image at infinity or at finity in a direction of the second holding plane along the optical axis with a second focal length on a second focal plane and
   to image at infinity or at finity in an opposite direction with a first focal length on the first focal plane; and/or
a beam source means which provides electromagnetic beams for generating and for capturing the evaluation image; and/or
a beam splitter means which deflects at least one part of the electromagnetic beams of the beam source means towards the photoactive system to be produced; and/or
an image capturing means which is designed to capture the evaluation image of the photoactive system to be produced, wherein the image capturing means is arranged on the first focal plane of the imaging module in order to capture the evaluation image of the photoactive system to be produced; and/or
a diffuser means for scattering the electromagnetic beams from the beam source means; and/or
a filter means for filtering electromagnetic beams having a wavelength to be filtered; and/or
a test structure device for generating a test structure on the photoactive arrangement of photoactive system to be produced.

7. The device according to claim 1, characterised in that the imaging device comprises a collimator, preferably a focusable collimator, and in particular an autocollimator.

8. The device according to claim 1, characterised in that the image capturing means comprises:
a camera for capturing the evaluation image, generated by the electro-optical system to be produced, of the respective at least one imaging arrangement; and/or
in particular a power electronics module for processing and transmitting the respective evaluation image captured by the image capturing means; and/or in particular an image sensor for capturing the respective evaluation image generated by the electro-optical system to be produced.

9. The device according to claim 1, characterised by an adjusting device for adjusting an orientation and/or a position of the first holding plane of the first holding device and/or of the second holding plane of the second holding device with respect to the beam passage plane of the at least one imaging arrangement; wherein the adjusting device preferably has a drive means.

10. The device according to claim 1, characterised by a support device which is designed to support the first holding device and/or the second holding device translationally and/or rotationally relative to the imaging device in an operating condition; and/or a drive means which is designed to drive the first holding device and/or the second holding device translationally and/or rotationally in the operating condition.

11. The device according to claim 1, characterised by a joining device which is designed to connect the photoactive arrangement and the optical arrangement to each other, in particular to connect them joiningly to each other.

12. The device according to claim 1, characterised by an evaluation device for evaluating the captured evaluation image of the at least one imaging arrangement, wherein the evaluation device:
- is preferably in signal communication with the imaging device, in particular with the image capturing means and/or an adjusting device and/or a joining device; and/or
- in particular has a power electronics module for processing and transmitting the evaluation image captured by the respective image capturing means; and/or
- in particular has a control means for controlling the adjusting device according to a result of evaluating the respective evaluation image captured and/or for controlling the joining device; wherein
- the control means includes, in particular, an autofocus module for automated focusing of the device in an operating condition.

13. The device according to claim 1, wherein the device is used to produce a photoactive system, in particular to produce a deactivated photoactive system, an electro-optical and/or optoelectronic system, in particular for a projecting and/or imaging electro-optical system.

14. A method for producing at least two photoactive systems in one of an electro-optical and an optoelectronic system, wherein the photoactive system to be produced comprises at least one optical arrangement and at least one photoactive arrangement, said method being characterised by the steps of:
- providing a device comprising:
  - an imaging device having at least one imaging arrangement, wherein the at least one imaging arrangement has a beam passage plane and an optical axis, and the at least one imaging arrangement is designed
    - to generate electromagnetic beams which extend along a beam path and pass through the imaging arrangement in a beam passage plane and
    - to image, on a first focal plane of the imaging arrangement, an evaluation image of electromagnetic beams reflected at the photoactive arrangement and
    - to capture the evaluation image imaged on the first focal plane; and
  - a first holding device having a first holding plane for simultaneously holding, on the first holding plane, the at least two optical arrangements of the at least two photoactive systems to be produced; and
  - a second holding device having a second holding plane for simultaneously holding, on the second holding plane, the at least two photoactive arrangements of the at least two photoactive systems to be produced; wherein
  - at least one of the first holding device having the first holding plane and the second holding device having the second holding plane is/are movably positioned relative to the imaging device; and
  - the imaging device is designed to be at least one of
    - movable in a translational manner relative to at least one of the first and second holding planes of a respective one of the first and second holding device, and
    - movable in a rotatory manner relative to at least one of the first and second holding planes of a respective one of the first and second holding device, and
- providing and arranging simultaneously of at least two photoactive arrangements in the second holding arrangement; and
- providing and arranging simultaneously of at least two optical arrangements in the first holding arrangement; and
- a moving in at least one of a translational manner and a rotatory manner the imaging device relative to at least one of the first and second holding planes of a respective one of the first and second holding device.

15. The method according to the preceding claim 14, characterised by the steps of:
- adjusting the optical arrangement with respect to the photoactive arrangement, wherein the step of adjusting includes, in particular:
  - providing an electromagnetic beam for imaging an evaluation image in the respective at least one imaging arrangement, and/or
  - imaging the evaluation image in the respective at least one imaging arrangement, and/or
  - capturing the evaluation image in the respective at least one imaging arrangement, and/or
  - evaluating the respective captured evaluation image, and/or
  - moving the first holding device with the optical arrangement disposed therein and/or the second holding device with the photoactive arrangement disposed therein, depending on the evaluation of the respective captured evaluation image; and/or
- assembling the optical arrangement adjusted with respect to the photoactive arrangement, wherein the step of assembling includes, in particular:
  - connecting, in particular joining, the optical arrangement to the photoactive arrangement; and/or
- testing the optical arrangement assembled opposite the photoactive arrangement, wherein the step of testing includes, in particular:
  - providing an electromagnetic beam for imaging an evaluation image in the respective at least one imaging arrangement, and/or
  - imaging the evaluation image of the adjusted and/or assembled photoactive system in the respective at least one imaging arrangement, and/or
  - capturing the evaluation image in the respective at least one imaging arrangement, and/or
  - evaluating the respective captured evaluation image; and/or moving the imaging device in order to produce a plurality of photoactive systems to be produced successively and/or simultaneously in relation to each other.

16. The method according to claim 14, characterised in that
capturing the evaluation image in the at least one imaging arrangement includes the following steps:
arranging the optical arrangement at infinity relative to the imaging device and/or the photoactive arrangement; and/or
arranging the optical arrangement in a setpoint position and/or a setpoint orientation relative to the imaging device and/or the photoactive arrangement; and/or
evaluating the respective captured evaluation image includes the following steps:
determining a frequency response characteristic of the captured evaluation image; and/or
comparing the captured evaluation image with a captured evaluation image of a photoactive system previously adjusted and/or assembled with respect to the photoactive arrangement; wherein,
in particular, the evaluation images are captured simultaneously or sequentially in the respective at least one imaging arrangement; wherein,
in particular, the comparison of the simultaneously captured evaluation images is based on a physical superimposition in the respective at least one imaging arrangement; and/or
in particular, the comparison of the simultaneously or sequentially captured evaluation images is based on virtual superimposition in the respective at least one imaging arrangement; and/or
comparing the captured evaluation image and/or the determined frequency response characteristic of the captured evaluation image with a desired target state; and/or
generating a control signal for moving the first and/or second holding device according to
the comparison of the captured evaluation image with a captured evaluation image of a photoactive system previously adjusted and/or assembled
with respect to the photoactive arrangement, and/or of the determined frequency response characteristic and/or of a determined offset; and/or
the comparison of the captured evaluation image with a desired target state, if the captured evaluation image does not match the desired target state; and/or
the comparison of the determined frequency response characteristic of the captured evaluation image with a desired target state, if the frequency response characteristic of the captured evaluation image does not match the desired target state.

17. The method according to claim 14, characterised in that the photoactive arrangement of the photoactive system to be produced is deactivated during adjustment and/or assembly and/or testing.

18. The method according to claim 14, further comprising:
providing and arranging a photoactive arrangement in the second holding device, in particular providing and arranging two or more photoactive arrangements in the second holding device.

19. The method according to claim 14, further comprising:
providing and arranging an optical arrangement in the first holding device, in particular providing and arranging two or more optical arrangements in the first holding device.

* * * * *